US010308434B1

United States Patent
Bojinescu

(10) Patent No.: US 10,308,434 B1
(45) Date of Patent: Jun. 4, 2019

(54) APRON FEEDER PAN

(71) Applicant: thyssenkrupp Industrial Solutions (Canada) Inc., Calgary (CA)

(72) Inventor: Dumitru Bojinescu, Calgary (CA)

(73) Assignee: Thyssenkrupp Industrial Solutions (Canada) Inc., Calgary (CA)

( * ) Notice: Subject to any disclaimer, the term of this patent is extended or adjusted under 35 U.S.C. 154(b) by 0 days.

(21) Appl. No.: 15/824,796

(22) Filed: Nov. 28, 2017

(51) Int. Cl.
*B65G 17/06* (2006.01)
*B65G 23/02* (2006.01)

(52) U.S. Cl.
CPC ........... *B65G 17/067* (2013.01); *B65G 23/02* (2013.01); *B65G 2201/02* (2013.01)

(58) Field of Classification Search
CPC .... B65G 17/067; B65G 17/126; B65G 17/14; B65G 17/10
USPC ................. 198/850, 851, 701, 712
See application file for complete search history.

(56) References Cited

U.S. PATENT DOCUMENTS

| 1,537,444 | A | * | 5/1925 | Herzog | ................ | B65G 17/065 |
| | | | | | | 198/850 |
| 1,883,528 | A | * | 10/1932 | Buck | .................... | B65G 17/067 |
| | | | | | | 198/822 |
| 1,922,908 | A | * | 8/1933 | Coleman | .................. | F26B 17/04 |
| | | | | | | 198/820 |
| 1,974,120 | A | * | 9/1934 | Noonan | .................. | B65G 15/54 |
| | | | | | | 198/820 |
| 1,995,821 | A | * | 3/1935 | Sargent | .................. | B65G 17/02 |
| | | | | | | 198/820 |
| 2,121,298 | A | | 6/1938 | Komarek | | |
| 2,215,418 | A | * | 9/1940 | Belcher | ................ | B65G 17/063 |
| | | | | | | 198/820 |
| 2,336,698 | A | * | 12/1943 | Morrill | .................... | F26B 17/04 |
| | | | | | | 34/223 |
| 2,416,634 | A | * | 2/1947 | McBride | ............. | B65G 17/067 |
| | | | | | | 198/500 |

(Continued)

FOREIGN PATENT DOCUMENTS

| CN | 201494885 | 6/2010 |
| CN | 203158671 | 8/2013 |
| CN | 203439597 | 2/2014 |

OTHER PUBLICATIONS

Yester, Martin A.; Metso Minerals Apron Feeders; National Weighing & Sampling Association Annual Technical Meeting, Aug. 19-21, 2002.

*Primary Examiner* — William R Harp
(74) *Attorney, Agent, or Firm* — Parlee McLaws LLP; Susan Rancourt; Sean Goodwin

(57) ABSTRACT

Apron feeders, having a material hopper and chain conveyors with outboard chain driven pans, are under significant stress and at risk of premature failure at the material-control wings. Herein, embodiments of pan are provided fit with mechanically-fastened wings to mitigate stress risers. Each pan has an upper plate with overhanging portions forming left and a right outboard chain connection. At a high stress location, between the hopper walls and the chain connections, the wings are mechanical secured to an upper plate of the pan. In embodiments, the wings are formed of an L-shaped wing, such as a bent plate, having a base portion for parallel and mechanical connection to the upper plate. The wing's base portion can be fastened with one or more of the bolt holes and bolts that also secure the pan to the chain conveyors.

20 Claims, 21 Drawing Sheets

(56) References Cited

U.S. PATENT DOCUMENTS

| | | | |
|---|---|---|---|
| 2,428,887 A | | 10/1947 | Munro |
| 2,593,084 A | | 4/1952 | Anderson |
| 2,823,790 A | * | 2/1958 | Sifford .................. B65G 39/20 198/822 |
| 2,950,000 A | | 8/1960 | Rivers |
| 3,259,228 A | * | 7/1966 | Wilding ............... B65G 17/067 198/836.1 |
| 3,575,277 A | | 4/1971 | Kilner |
| 3,690,445 A | * | 9/1972 | Ouska .................. B65G 17/067 198/822 |
| 3,934,712 A | * | 1/1976 | Jende ................... B65G 17/067 198/834 |
| 4,167,999 A | | 9/1979 | Haggerty |
| 4,513,859 A | | 4/1985 | Long et al. |
| 4,542,821 A | * | 9/1985 | Livermore ........... B65G 17/067 198/822 |
| 4,718,541 A | * | 1/1988 | Wilding ................... A24B 3/00 198/699.1 |
| 5,042,647 A | * | 8/1991 | Tyler .................... B65G 17/067 198/822 |
| 5,069,330 A | | 12/1991 | Palmaer et al. |
| 5,310,045 A | | 5/1994 | Palmaer et al. |
| 5,660,283 A | | 8/1997 | Groh et al. |
| 6,036,001 A | | 3/2000 | Stebnicki et al. |
| 6,471,048 B1 | | 10/2002 | Thompson, Jr. et al. |
| 6,662,930 B2 | * | 12/2003 | Yester ..................... G01G 11/00 177/119 |
| 9,540,175 B1 | * | 1/2017 | Van Dalsem .......... B65G 17/32 |

\* cited by examiner

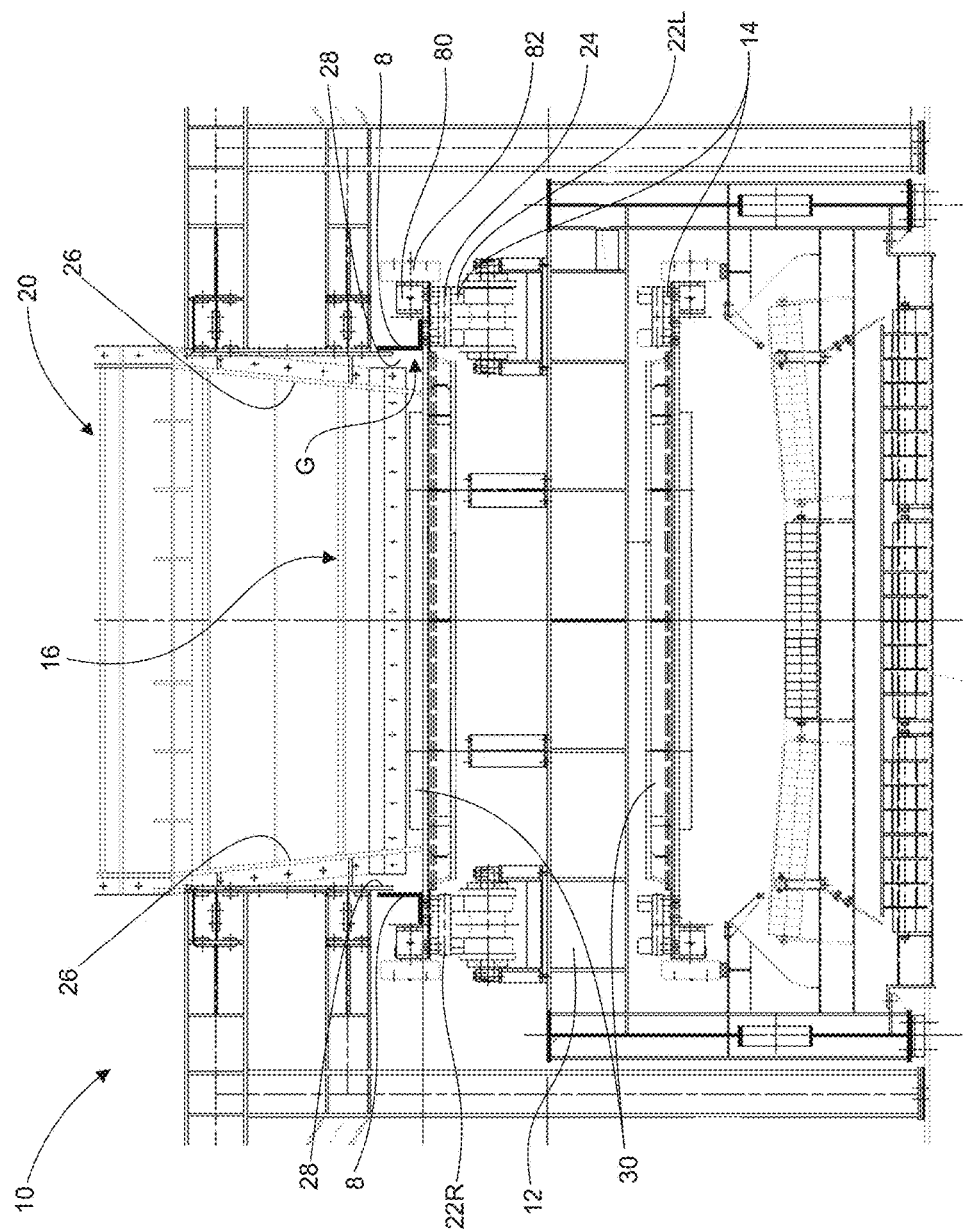

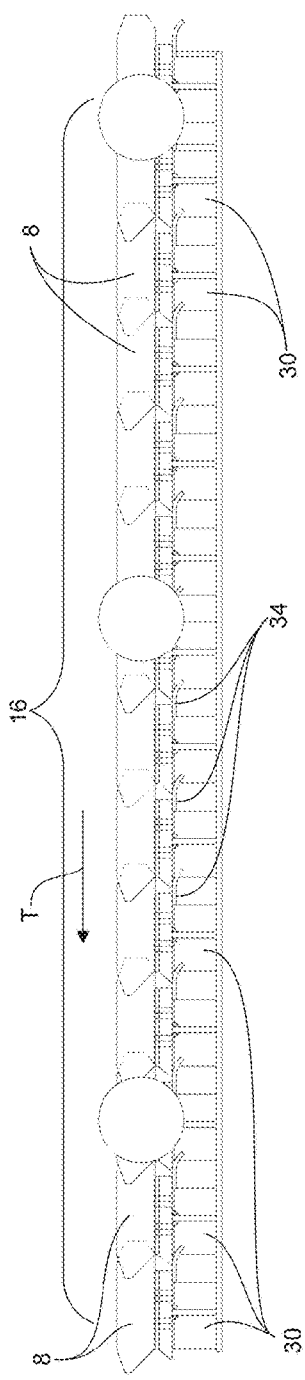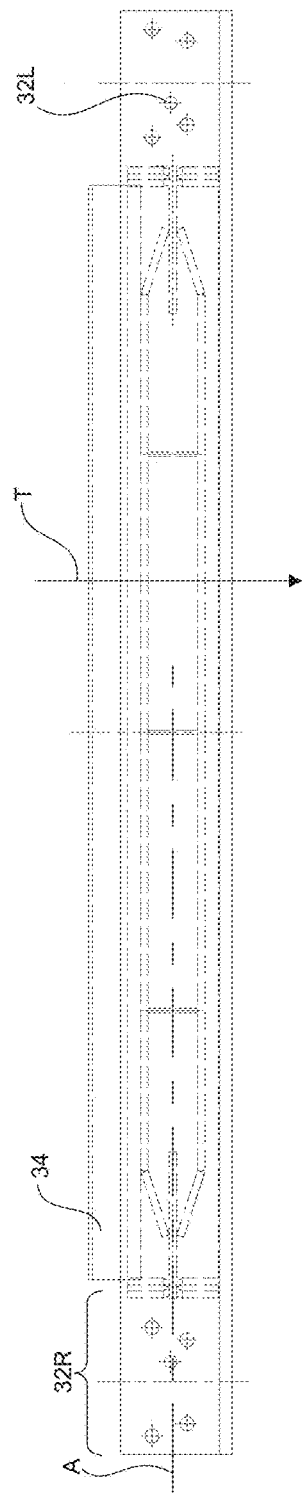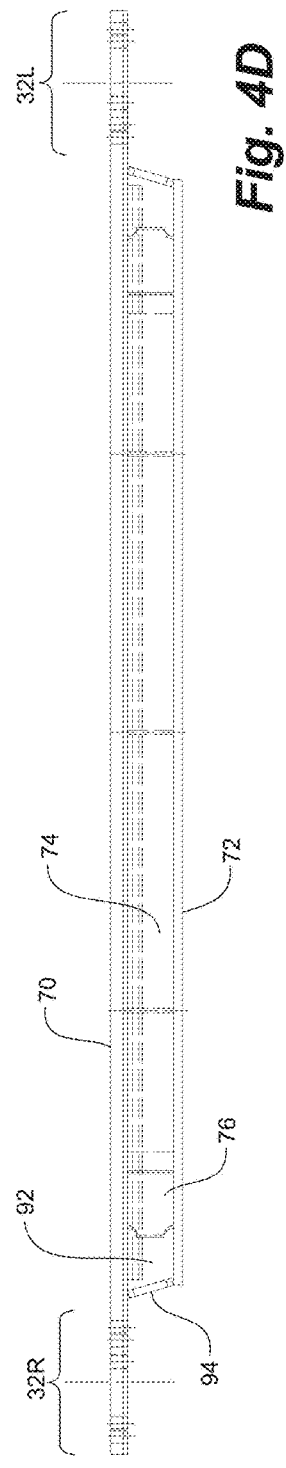

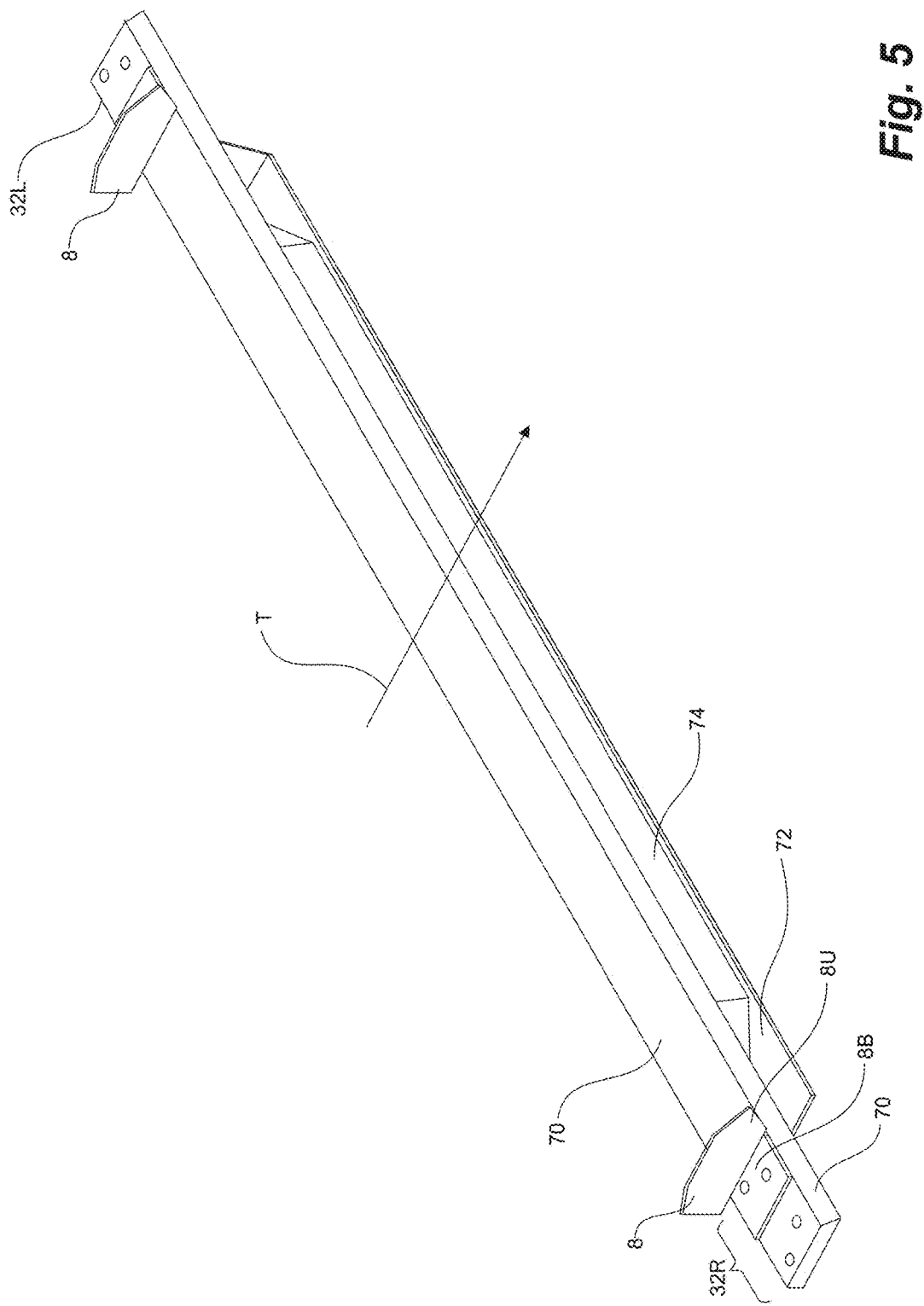

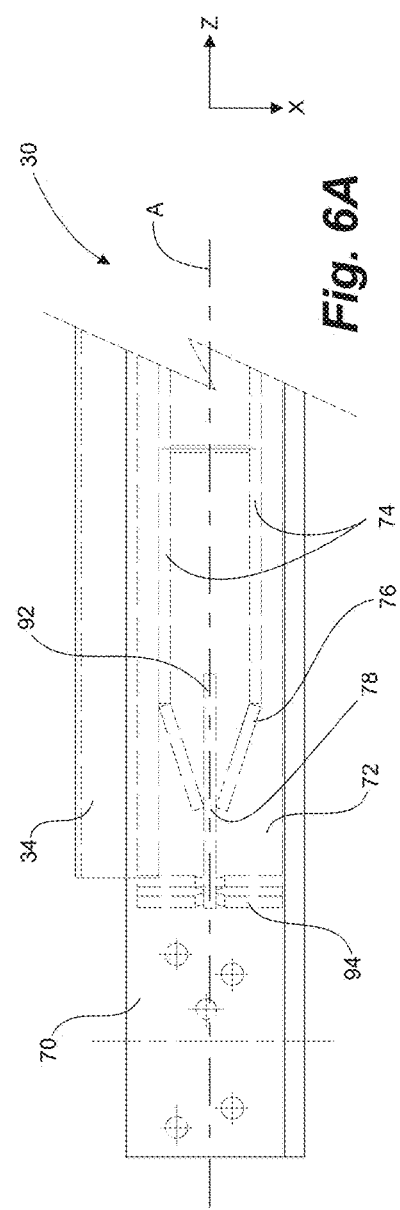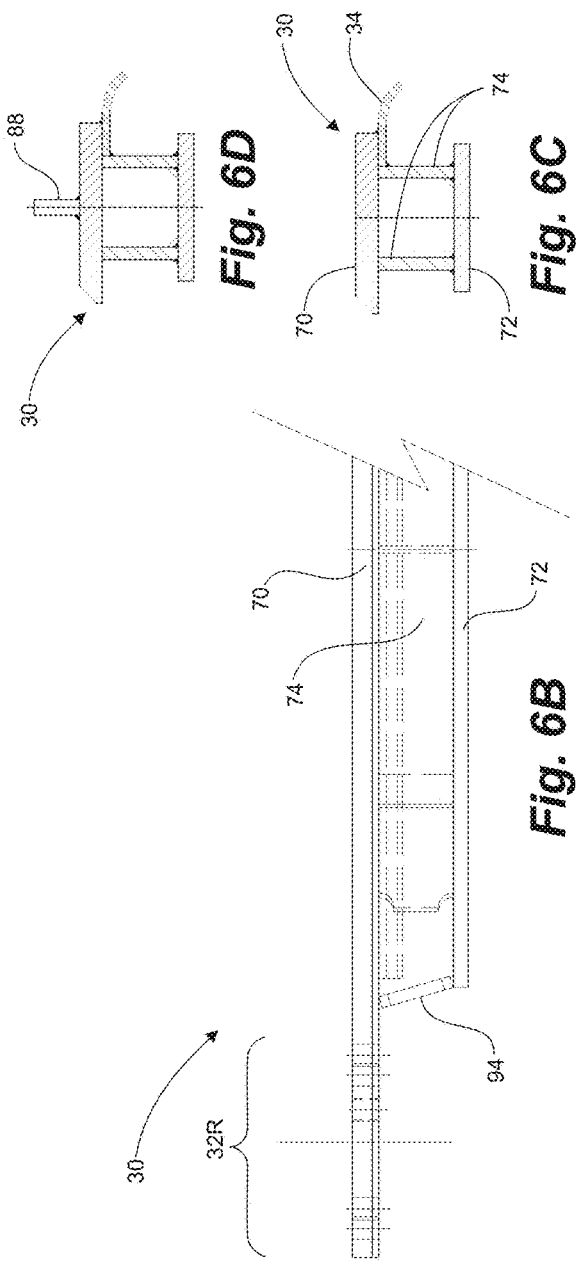

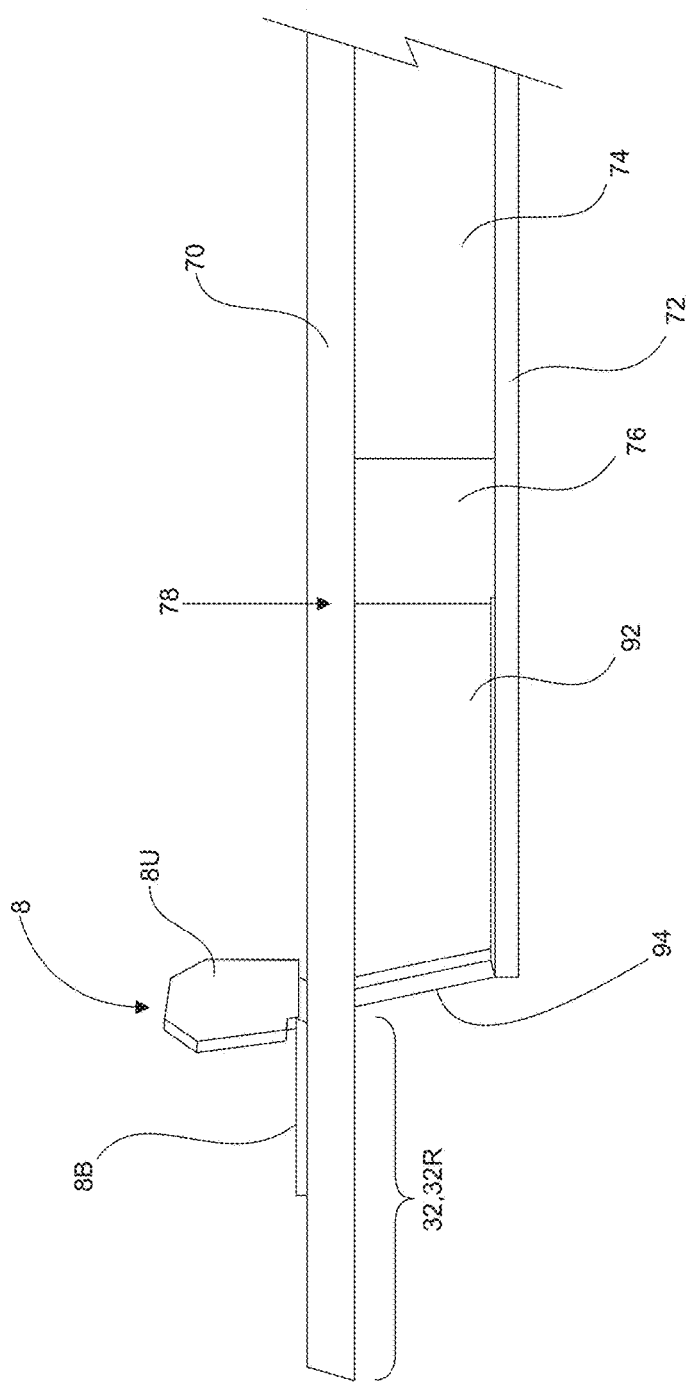

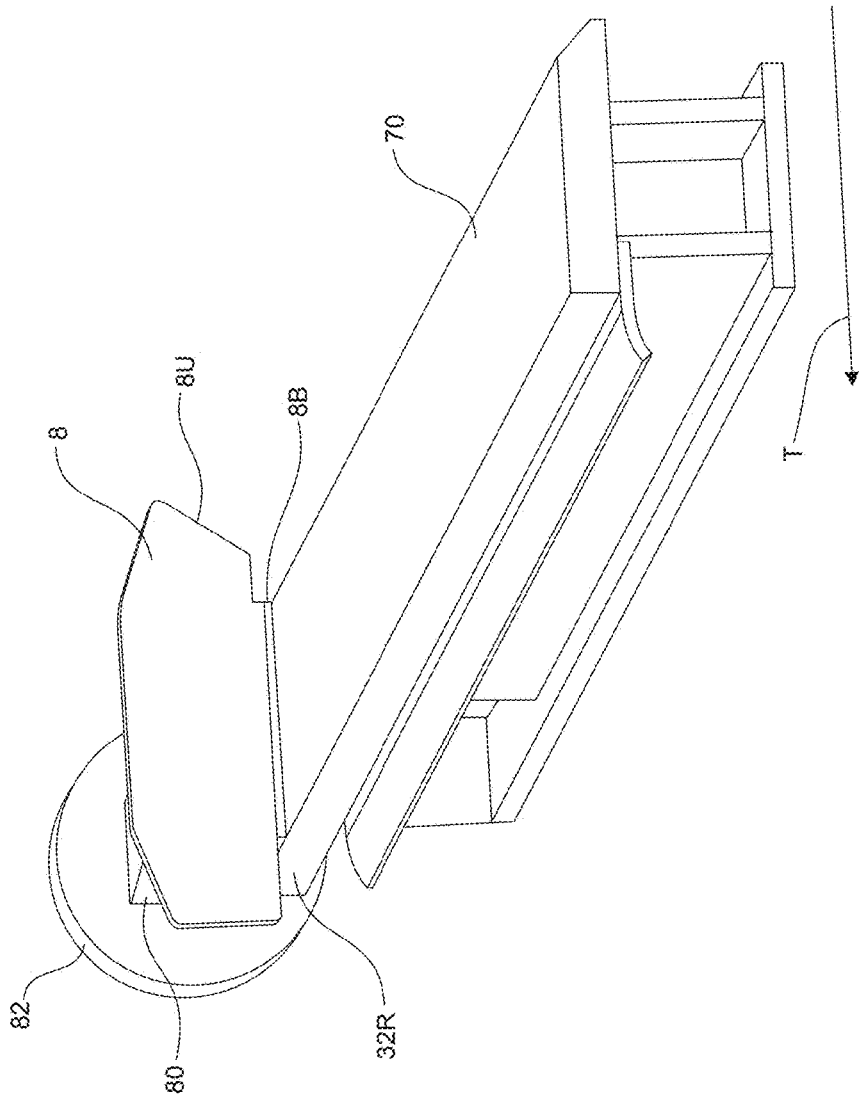

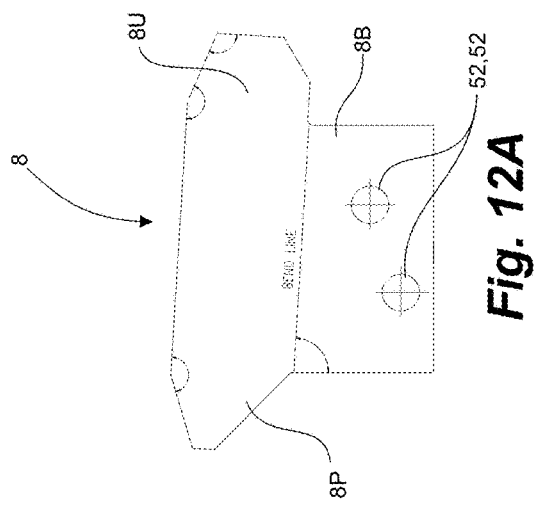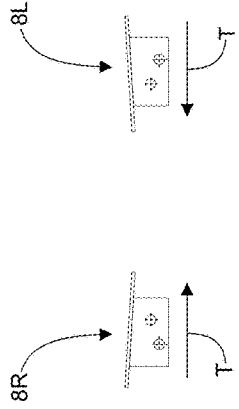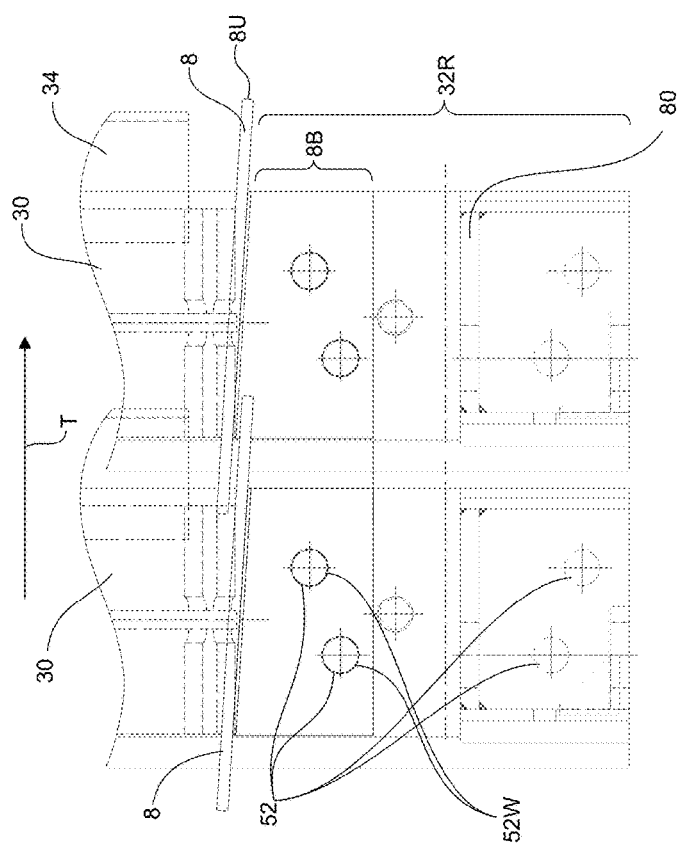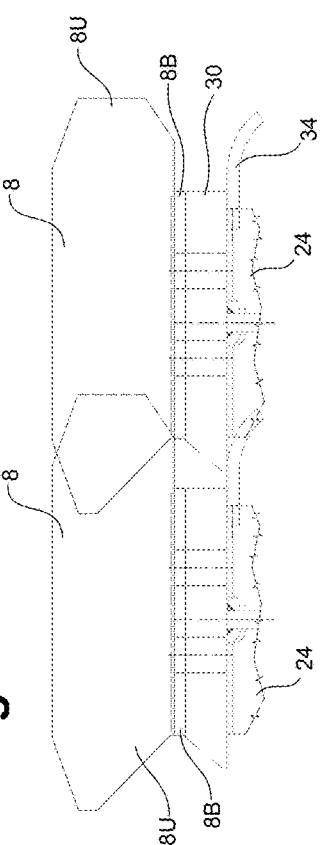
Fig. 12A  Fig. 12B  Fig. 12C  Fig. 12D  Fig. 12E

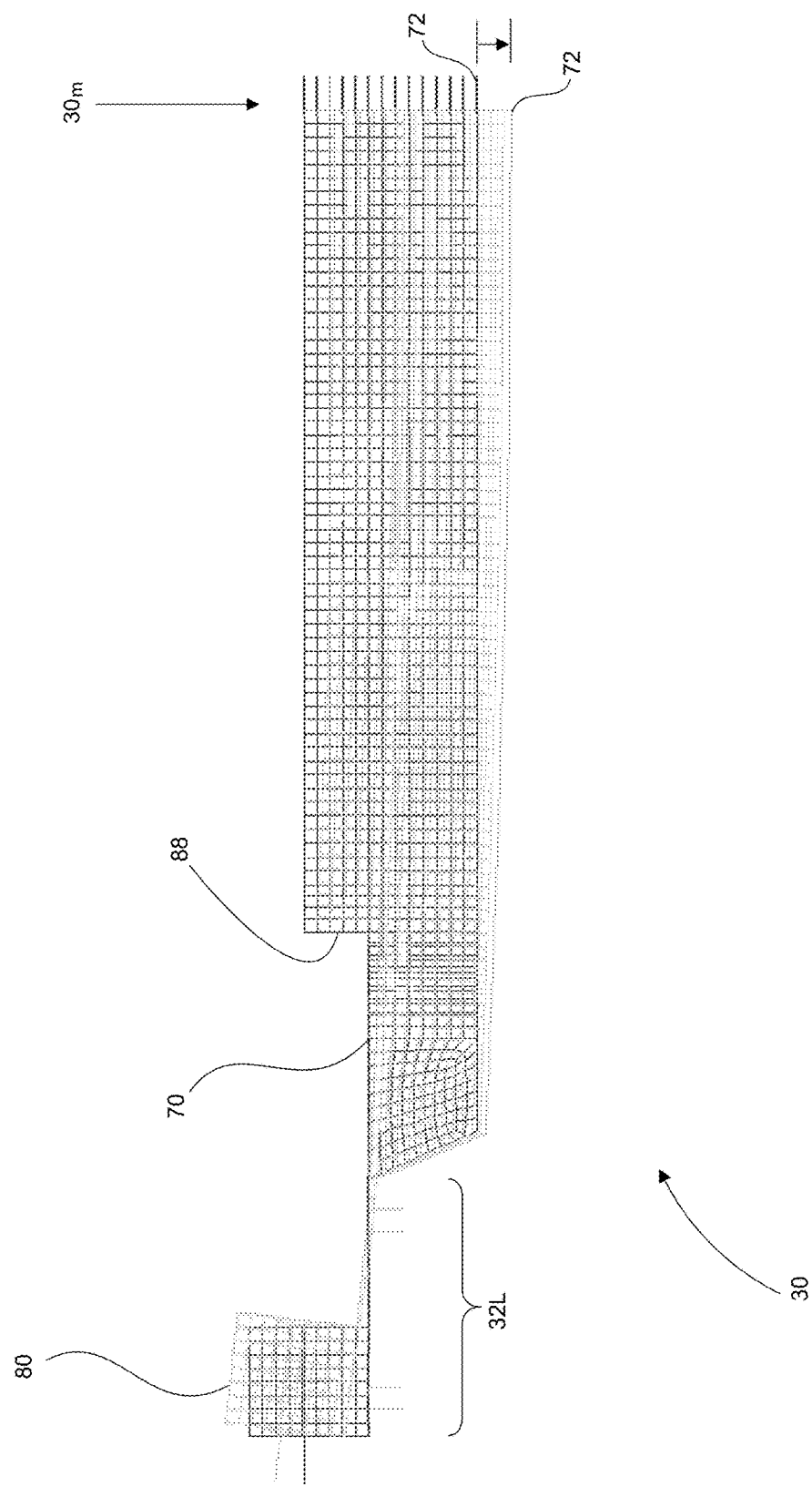

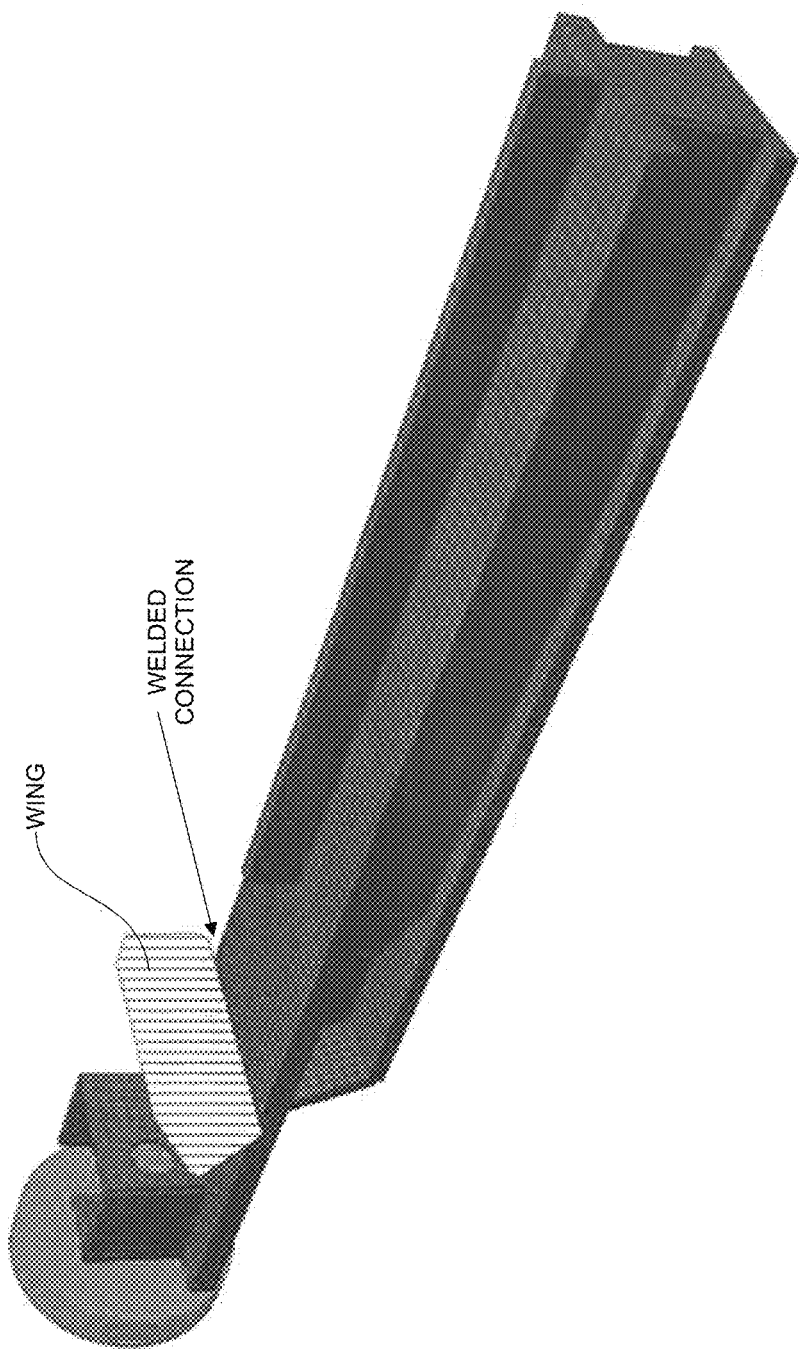

APRON FEEDER PAN

FIELD

Embodiments herein relate to apron feeders, and more particularly to conveyor flights or pans therefor, each pan having spaced material retaining-wings.

BACKGROUND

Apron feeders are typically used in the mining, cement, and other bulk materials industries for extracting bulk materials from bins, hoppers, silos, stockpiles, and the like. Apron feeders are specified for feeding wet, sticky, lumpy, large, abrasive, and heavy materials. The apron feeders are often used to control material feed rate from hoppers and to transfer material between locations. Some specific uses of apron feeders known in the art are applications such as feeding and withdrawing materials from primary crushers, loading and unloading trucks and railcars, removing frozen materials from storage, feeding jaw crushers and belt conveyors, and high abrasion applications frequently found in reclaim circuits. Early forms of apron conveyors include U.S. Pat. No. 3,934,712 to Jende and U.S. Pat. No. 1,537,444 to Herzog.

As shown in FIG. 1, typically apron feeders comprise a frame supporting an endless linked flight or pan conveyor. An upper surface or material bed of the conveyor receives material, such as from a hopper, and conveys the material a short distance to a head shaft, before the conveyor belt rolls over the head shaft and returns to the tail end to repeat the operation.

The conveyor belt comprises two or more parallel and endless conveyor chains and a series of individual and transverse-extending pans connected to the chains and which extend transversely to the chains, forming a substantially continuous material-bearing bed surface. Conveyors of more current apron feeders implement more substantial pans, each of which is mounted atop a chain link, pans or groups of pans alternating between a featureless surface and material engaging plates or grousers.

The head shaft is fit with drive sprockets for synchronously pulling the chains, connected pans and supported material to the head shaft. A tail shaft or spaced tail guide sprockets are located at an opposite end of the frame from the head shaft for receiving the returning conveyor portion and directing it back towards the head shaft. A slide, plurality of idler rollers or both are located between the head and tail for supporting the conveyor under the weight of the conveyor and its material load.

Each of the pans is independent and is closely adjacent or overlapped with the adjacent pan capable of forming a continuous and planar upper surface for bearing process material thereon, whilst remaining separate or discrete so as to enable rolling transport about the head shaft and tail sprockets. The live load of material is generally funneled by the hopper walls to the material bed of the conveyor. The hopper walls are spaced laterally apart and straddle the material bed.

The conveyor belt comprises two or more parallel and endless conveyor chains, typically two, and a series of individual and transverse-extending pans connected to the chains, forming a substantially continuous material-bearing bed surface. The pans are connected to the chains adjacent the pans opposing ends. The pans are arranged like adjacent railway ties extending transverse to spaced chains, typically two chains. The pan is fastened or connected to each chain, and forms a middle span portion between the chain connections. Each of the opposing ends of the pans projects outward, cantilevered from its respective the chain connection. The pan forms a simply supported beam, transferring load to the chain connections.

The location of the connection of the pans, to the spaced chains, whether closer to the pan's middle or closer to the pan's ends, falls into one of two configurations: inboard and outboard chain connections.

Inboard chain connection locates the chains laterally inward, closer to the pan's middle portion and within the bounds of the material bed. The hopper walls are located outward of the chain connections. This places the chain connections under the live load, with greater exposure of the chain connections to the conveyed material. Inboard chain connection minimizes bending loads between the parallel chain drive connections and, due to the nature of the material, is preferably used in the conveyance of rock. A disadvantage of placing the moving components, and particularly the chain components, and chain connections under the live load is exposure to material spillage and poor maintenance access.

Outboard chain connection places the chain's connections wider apart, outboard, or outward of the feeder walls, and is better suited for better protecting the chain's pan connections, links and drives from highly abrasive materials. Further, the chain links and connection are outside the hopper walls and apron feeder structure for ease of access, repair and component replacement. The disadvantage is an increased span of the middle portion between the chain connections resulting in higher bending loads and stresses.

Bottom edges of the spaced hopper walls terminate with a wall gap, short of the pan's upper surface, and are inward of the pan's ends to minimize material losses. To minimize spillage, each pan is equipped with a side wall, plate or wing that stands upright from each end of the pan adjacent and just outward of the hopper walls. The wings are spaced to straddle the hopper wall's bottom edges. The wings are oriented to complement the plane of the respective bottom edges and are located laterally immediately outward and adjacent thereto to minimize material escape out from the wall gap. Each wing is also angled or laterally splayed and overlapping to overlap axially with like wings on adjacent pans to reduce spillage between wings on adjacent and discrete pans, creating a substantially continuous sidewall over the entire length of the material bed of the apron feeder.

On feeders with inboard chain connections, such as U.S. Pat. No. 6,662,930 to Yester (Metso Minerals Industries Inc, Pittsburgh, Pa.), and reproduced here as FIG. 1, the wings are typically attached to the outwardly-cantilevered, distal ends of each pan. The chains are inboard of the hopper walls. The distal ends are at the lowest stress location on the pan. As the wings are secured to the free ends of the pans, the mechanical design for attachment is not a design issue of concern. The wings are typically welded to the pan's distal ends.

On feeders with outboard chain connections, attachment of the wings to the pans is made inward of the each chain's connections, between the respective chain connection and the hopper walls. This also is a location subject to the highest stress points on the pans under live loads. In one case, shown in U.S. Pat. No. 2,416,634, outboard chain drives are provided and sidewalls or wings are welded to the pans. This early design has been used to date, including in Applicant's own apron feeders with outboard chain connections. As a result, failures occur at a higher frequency than desired. Applicant notes that welding of the wings to the pans causes a heat-affected-zone (HAZ) that results in a stress concentrated zone and requiring specialty welding procedures and ultimately reduced fatigue life.

The welded wings are located inward of the outboard connection to the chain links and thus are in the high stress zone that is susceptible to failure and limits the life of the pan. Apron feeders are typically used in high volume, difficult material handing environments, the operation of which are sensitive to unexpected failures or frequent servicing. If not detected, Applicant is aware of pan failures through catastrophic separation of one end of the pan at the weld and loss or driving connection to the chain. The opposing end of the pan, which is unlikely to have failed simultaneously, continues to be driven until detection. The large horsepower of the drives results in significant damage to adjacent hardware and typically a shutdown of the entire apron feeder.

There remains an objective to use outboard chain connections for apron feeder pans for conveyance of difficult materials, yet while minimizing pan structural failures.

SUMMARY

Oil sands of the northern Alberta region are characterized by a mixture of about 10% heavy oil known as bitumen, 5% water and 85% clay and silica sand.

This is a difficult material to handle and places a significant toll on equipment including apron feeders. Challenges include wide seasonal variations of the oilsands characteristics including presenting as a solid in winter, and a viscous, highly erosive material in summer. The conveyance or transport of oil sands requires consideration of a wide range of material handing considerations. In apron feeders handling oilsands, each end of each pan is fit with a wing, the wings being critical due to the difficult nature of the oilsand material, particularly in warm conditions in which the viscous abrasive oilsand matrix more readily flows under the gap of hopper walls.

Herein, Applicant implements apron feeder pans each of which has an outboard chain connection, for improved general maintenance of the apron feeder, but at the risk of the nature and quality of the wings attachment to the pans, in particular, being located at the high stress interface between the hopper walls and the outboard chain drive connection.

Accordingly, in one aspect, for improved pan fatigue life, a pan is provided having and mechanically-fastened wings. Each pan has spaced wings for an apron feeder having a material hopper and outboard chain conveyors, the chain conveyors having a plurality of transversely extending pans and wings mounted thereon. Each pan comprises an elongate beam structure extending transversely across the chain conveyors and having an upper plate with overhanging portions at opposing left and right distal ends. Each left and right distal end of the pan's upper plate has a left and a right outboard chain connection interface for connection to the outboard chain conveyors. Each left and right distal end is fit with an L-shaped wing plate having a base portion for parallel and mechanical connection to the upper plate, and an upstanding portion located inward of the outward of the connection of the distal ends to the outboard chain conveyors.

In another aspect an apron feeder is provided having the pan and wing combination as set forth above An apron feeder conveyor, fit with such improved pans, comprises a plurality of adjacent pans, each pan connected to corresponding left and right opposing chain links sets of axially extending, parallel and spaced endless conveyors, the plurality of adjacent pans forming a material bed between opposing hopper walls, the material bed having a bed width supporting and transporting a live load of material axially along the feeder. Each pan comprises an elongate beam structure extending transversely across the conveyor and having a beam axis, the beam structure having an upper plate with overhanging portions, extending outward at opposing left and right distal ends, each left and right distal end having a left and a right outboard chain connection interface for mechanical securement to corresponding left and right chain link sets. Further each left and right distal end of the pan is fit with a wing comprising an L-shaped wing plate having a base portion for parallel and mechanical connection to the upper plate, and an upstanding portion located outward of its respective hopper wall for restraining material bed within the hopper wall.

The disclosed embodiments of the pan, the mechanically fastened straddling wings and apron feeders implementing the improved pans result in an increased operational life. Further, any wing failure does not result in a pan failure, the severity of such a wing failure being significantly reduced. A wing failure does not result in a feeder failure, but permits continued operation until scheduled maintenance permits wing replacement on the existing and undamaged pan.

BRIEF DESCRIPTION OF THE DRAWINGS

FIG. 4A is an end cross-sectional view of one embodiment of an apron feeder of the outboard drive form with embodiments of mechanically fastened or bolted wings inward of the outboard drive connection to restrain material exiting from under the hopper gap;

FIG. 4B is a side view of a portion of the conveyor's material bed portion of the conveyor and illustrating overlapping pans and bolted wings, some pans of which are fit with embodiments of carry rollers or idlers, each comprising an idler bracket and idler wheels;

FIGS. 4C and 4D are plan and side views of an embodiment of a pan, the plan view illustrating the pan box beam structure in hidden lines;

FIG. 5 is a perspective view of a pan with an embodiment of the wing installed at opposing left and right distal ends of the pan;

FIGS. 6A, 6B and 6C are partial plan, side and cross-sectional end views of a standard pan according to FIGS. 4A through 5;

FIG. 6D is cross-sectional end view of a grouser pan used in conjunction with the standard pans of FIGS. 6A to 6C;

FIG. 7 is a partial side view of the right distal end of the pan of FIG. 6A;

FIG. 8 is a partial perspective view of the right end of the pan of FIG. 7, the pan illustrating the box beam structure, a pan-to-pan overlap skirt, a bolted wing and an idler;

FIG. 12A through 12C illustrate a rolled out wing plate and mirrored right and left wings folded with the upstanding wing portion projecting out the sheet;

FIGS. 12D and 12E are side and plan views of a right distal end of two standard pans with bolted wings arranged thereon, the plan view further illustrating an idler bracket;

FIG. 14 is a side view of the 3D model illustrating the deformed shape of the pan under the combined service load;

FIG. 16 is a partial perspective view of the right end of a pan using the welded wing of the prior art on the same 3D model of the beam as used for the FEA analysis of FIG. 15B.

DESCRIPTION OF THE PREFERRED EMBODIMENTS

On apron feeders, side wall plates or wings limit spillage/leakage from the gap between the hopper and the hopper's side walls. For oilsand feed material, spillage and leakages issues are exacerbated in the warmer seasons as the viscosity of the raw material being transported decreases and becomes less resistive to the downward pressure exerted by the weight of the material. A portion of the oil sand spills or extrudes out of the wall gap. Each upstanding wing plates toes-in rearwardly to overlap, when coupled in the material bed, with the forwardly splayed wing plates on adjacent pans to further reduce spillage by effectively creating a continuous sidewall over the entire length of the upper surface of the apron feeder, driving any spill inward, back towards the feeder's material bed. The wings limit material loss that otherwise accesses the drive chains, related equipment below the apron feeder and general site buildup any of which can cause expensive downtime for repair or cleanup.

Figure 1:
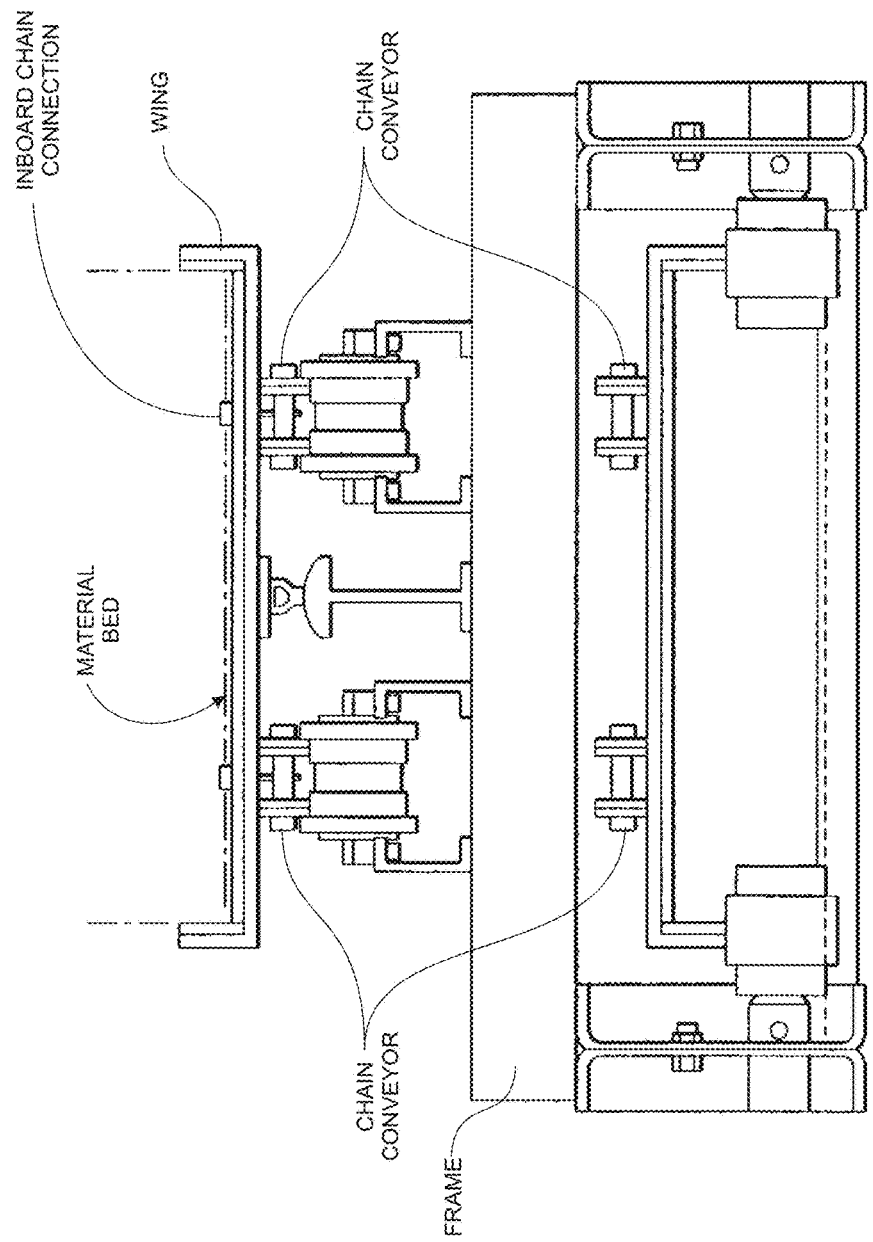
FIG. 1 is an end cross-sectional view of a prior art apron feeder of the inboard drive form, the pans having wings affixed to distal ends of the pans, outboard of the respective chain drive.
Figure 2B:
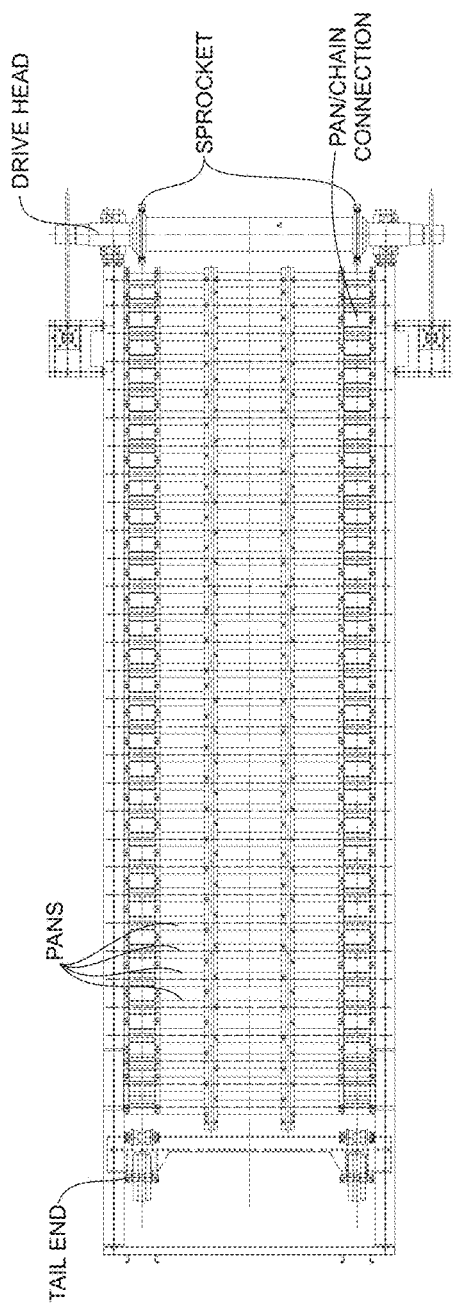
FIGS. 2A and 2B are right side and plan views of an typical apron feeder, side walls of the hopper removed for clarity in the material bed area, the plan view taken along A-A of FIG. 2A to view the conveyor return path.
Figure 2A:
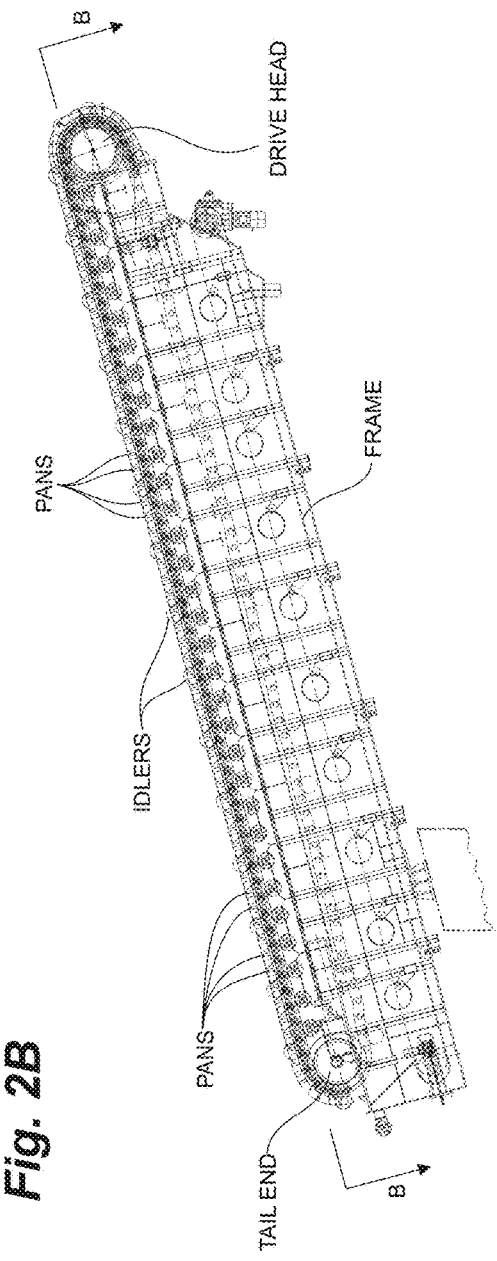
Figure 3A:
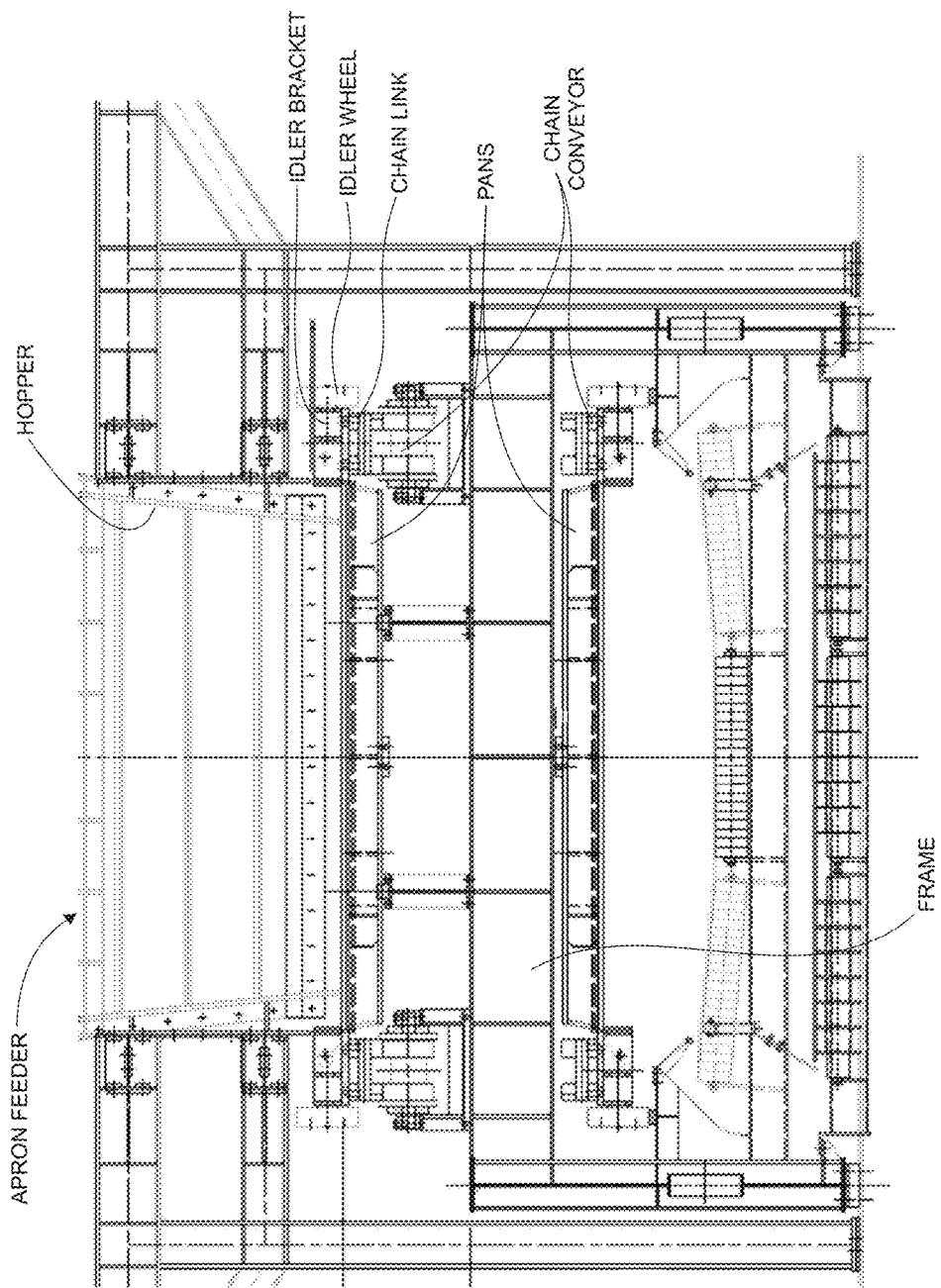
FIG. 3A is an end cross-sectional view of a prior art apron feeder of the outboard drive form, the pans having wings welded inboard of the chain drive and illustrated in association with hopper walls.
Figure 3B:
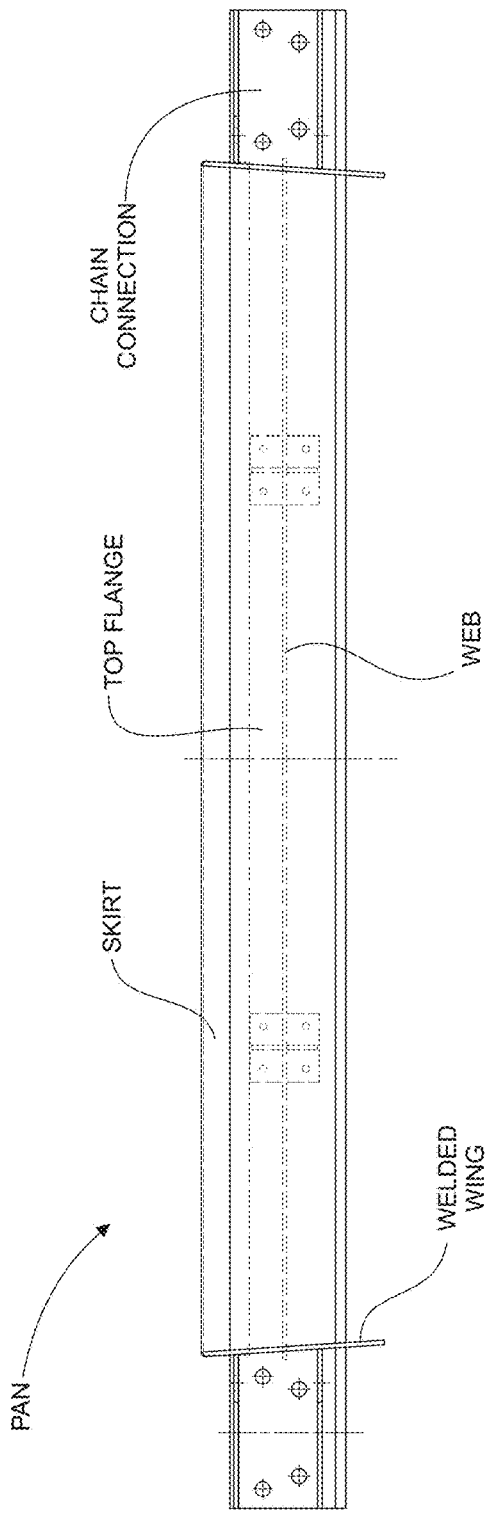
FIGS. 3B and 3C are plan and end views of a form of a prior art standard pan of FIG. 3A, illustrating a welded wing inward of the outboard chain drive connection.
Figure 3C:
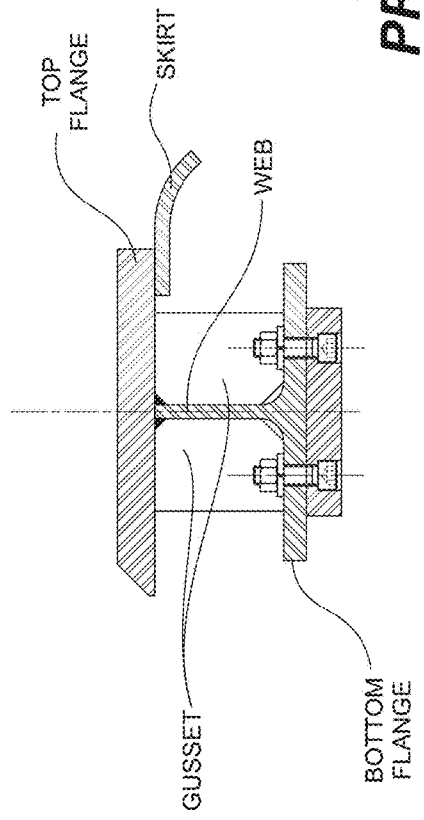
Figure 3D:
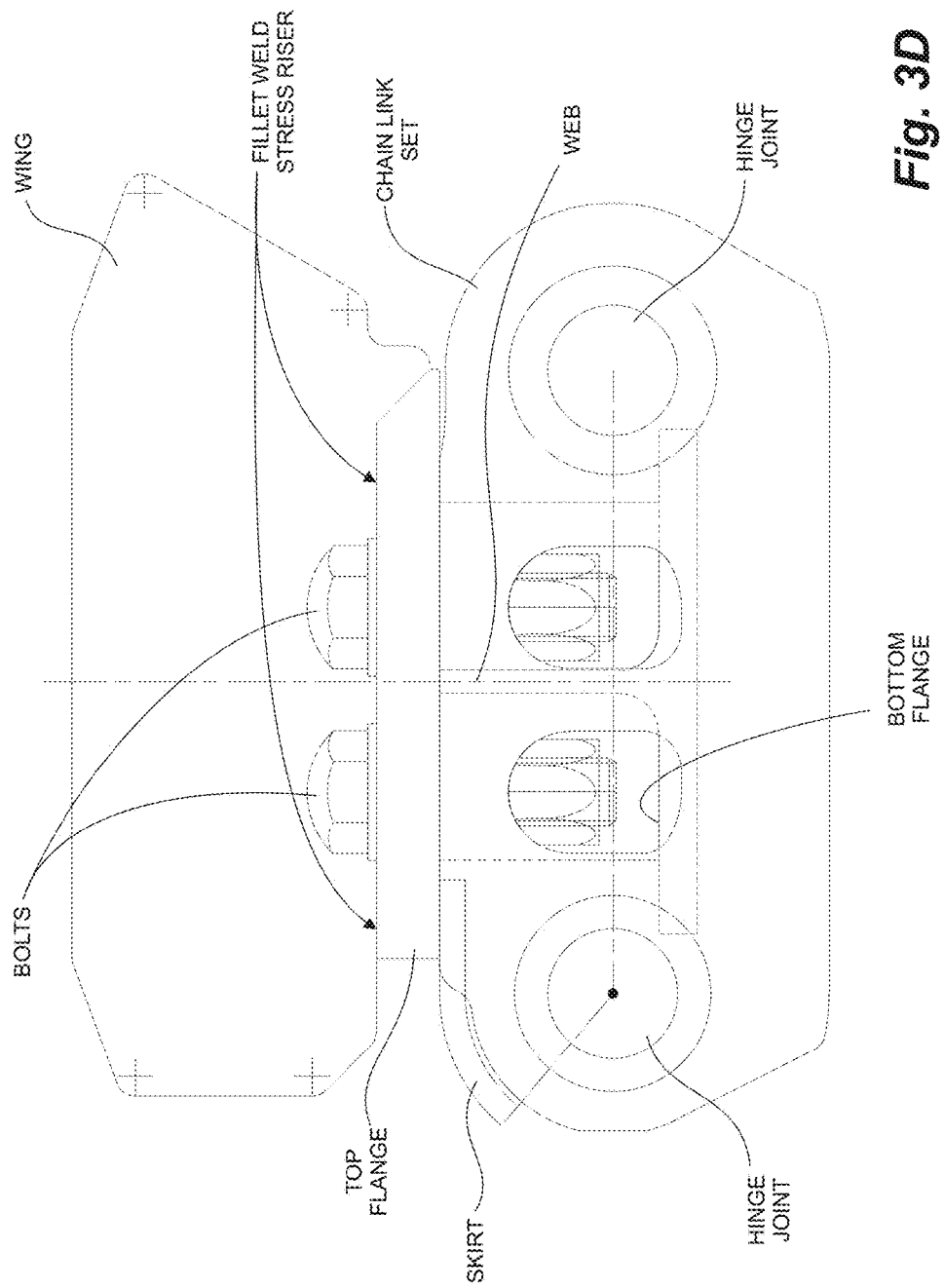
FIG. 3D illustrates and end view of one claim link set fit with a pan and welded wing of the prior art.
Figure 9:
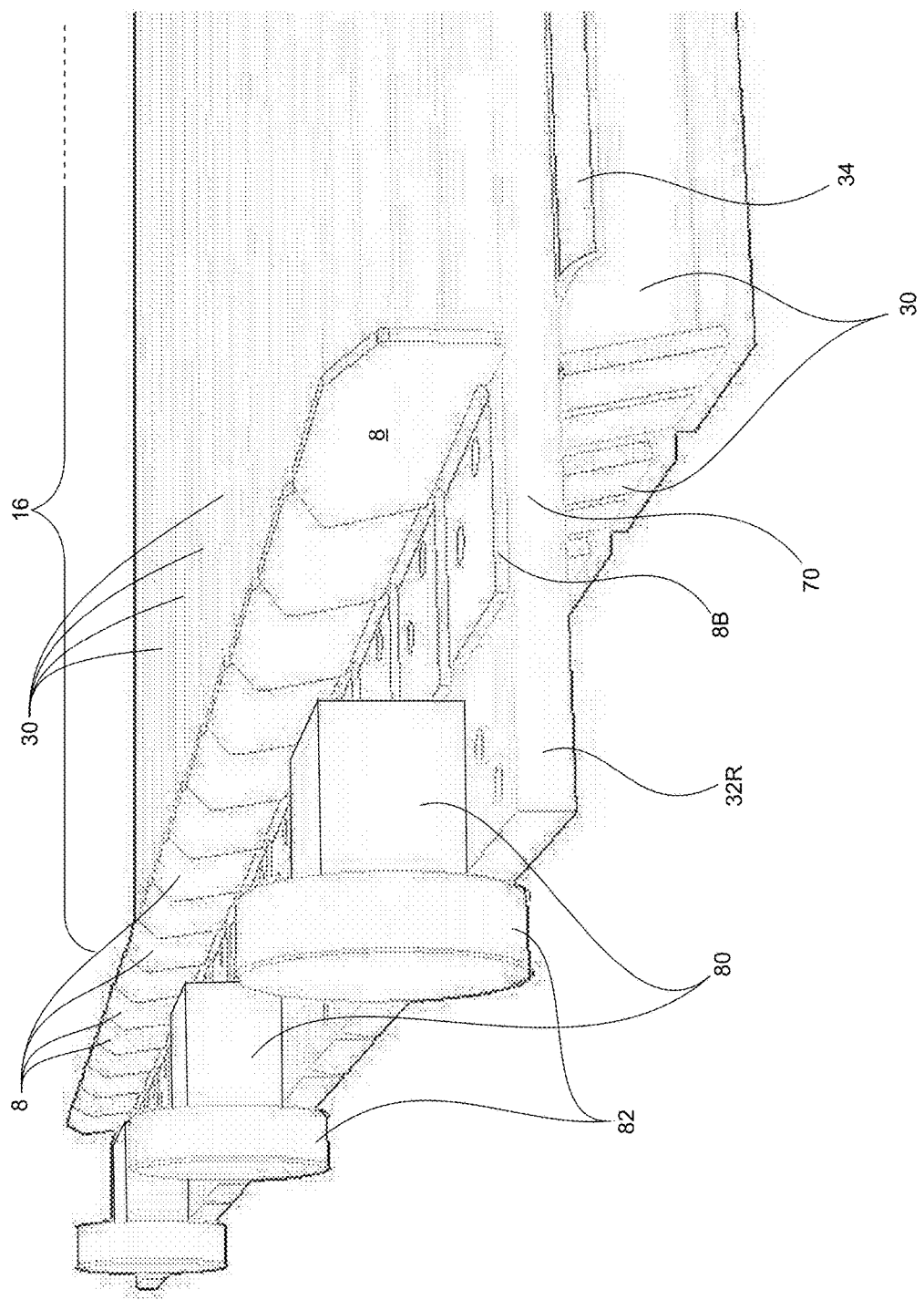
FIG. 9 is an end perspective view of a plurality of standard pans forming a material bed, the upstanding portion of the bolted wings overlapping for a continuous material barrier and periodic placement of idlers on spaced pans.
Figure 10:
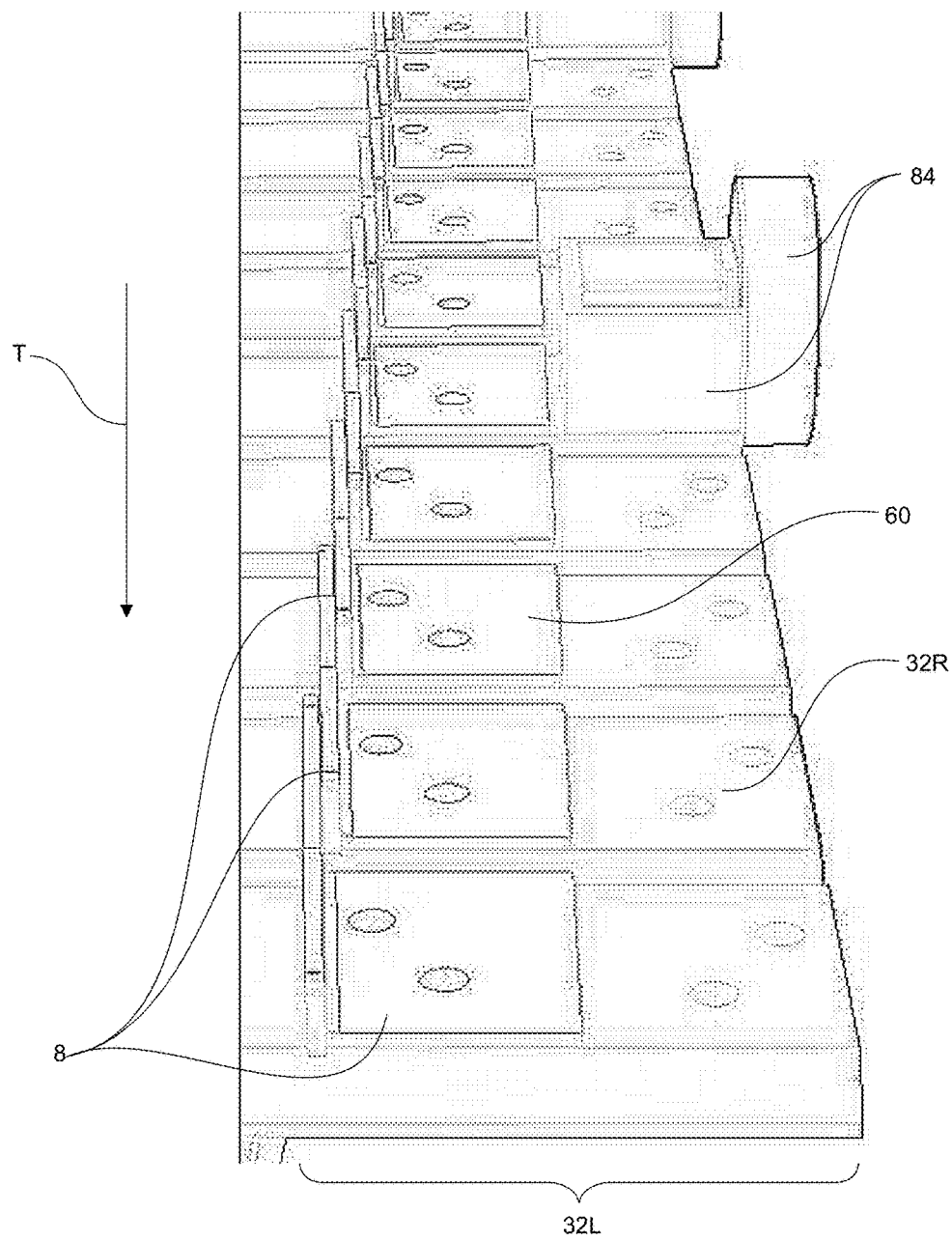
FIG. 10 is a front, perspective view of the plurality of pans of FIG. 9, the mechanical fasteners removed from the bolted wing and pan distal end for illustrating the wing base and the chain connection fastener pattern.

Referring to generic FIGS. 2A and 2B and to FIGS. 3A, 3B and 3C, Applicant's own prior pans implemented welded wings and significant brackets for conveyor chain idlers. Each pan of the prior design comprised an I-beam structure, having top and bottom flanges of plates and an intermediate web, the top flange of which was fit with the wings and idlers. Each wing was welded to the top flange at the end of the pan, just inboard of the outboard connection. The idler brackets were welded to the top flange over the entirely of the outboard chain connection and an idler was cantilevered outwards from the bracket. The wing's connections and structure were prone to premature fatigue failure, the usable life being below a nominal operational lifespan. Further, idler mounting brackets or structure, that were welded over the entirely of the chain connection and including the high stress area inward of the connection interface may have also been introducing additional stress risers.

Further, Applicant is restricted in resolving wing-related pan design by adapting to standardization in the industry to a limited range of chain supplier and chain link configurations. The pan must connect to chain links of a given configuration, for example chains sold by CATERPILLAR™ or KOMATSU™, all of which have a bolting pattern set forth in each link, originally and typically designed for attachment of equipment tracks.

With reference to FIGS. 4A through 4D, herein, an improved pan is provided, and suitable for oil sand conveyance. Applicant continues to implement an outboard chain connection to minimize material contamination of the frame and support equipment, with the accompanying tradeoff and continuing challenge that the wings must continue to be located at a high stress location on each pan, inward of the outboard chain connection interface and outward of the hopper walls.

Turning to FIG. 4A, in an embodiment, pan failures are minimized and mitigated by mechanically fastening wings 8,8 to each end of the pan's structure, just inward of, and adjacent the chain drive connection ends of each pan.

The general structure of the apron feeder 10 is similar to that of the feeder of FIG. 3A, excepting the use of new pans. A frame 12 supports an endless linked pan or chain conveyor 14. An upper surface or material bed 16 of the conveyor 14 receives material, such as from a hopper 20. With reference to FIGS. 2A and 2B, the conveyor conveys the material a short distance to a head shaft, before the conveyor belt rolls over the head shaft and returns to the tail end to repeat the operation.

The pan or chain conveyor 14 comprises two or more parallel and endless conveyor chains 22, typically two chains 22L,22R, and a plurality of individual and transverse-extending pans 30, 30, . . . which extend perpendicular and transverse to the chains 22L,22R. Each pan 30 is connected to corresponding chain link 24,24 of the two chains 22L,22R which form a substantially continuous material-bearing bed surface 16, as shown in FIG. 4B. Skirts 34 can be provided, extending from a leading or trailing edge of the pan to bridge a gap between adjacent pans 30,30, while permitting conveyor function as the conveyor 14 continues it endless path about the drive to tail ends.

The upper surface of standard pans is generally featureless, using friction between the upper surface and the material to enable material transport along the bed. Depending on the material characteristics, select pans, spaced along the conveyor, can be fit with upstanding material engaging bars or grousers, termed herein as grouser pans. Periodically, the frequency of which depends on the material characteristics, some standard featureless pans, of the plurality of pans, are replaced with a grouser-equipped pan. Grouser pans are fit with an additional upstanding bar along the upper surface thereof for direct engagement with the material to enhance the frictional mode for otherwise featureless standard pans.

The live load of material is generally funneled to the material bed 16 of the conveyor 14 by spaced hopper walls 26,26 that straddle the material bed 16. Bottom edges 28,28 of the spaced hopper walls 26,26 are inwardly spaced yet adjacent the pan's ends to maximize the width of the material bed 16. Each hopper wall terminates short of the pans 30, forming a clearance gap G to avoid wall-to-bed interference. This clearance gap G is the source of material leakage that is controlled by the wings 8.

With reference to FIGS. 4C and 4D, the pans 30 are connected to the chains 22L,22R adjacent opposing distal ends 32L,32R. As shown, the connection between the pans 30 and the chains 22L,22R is outboard of hopper walls 26,26. The pan 30 is a structural beam subject to downward loads and to in-line drive loads. The pan 30 deflects under the loads, supported at the spaced chain links 24,24. The majority of the length of the pan 30 bends between the spaced chains 22L,22R, and as the pan ends are also rotationally restrained about the vertical axis by the chain conveyors 14, maximum bending and shear stresses are observed to occur at the chain connection 32L,32R.

Figure 11A:
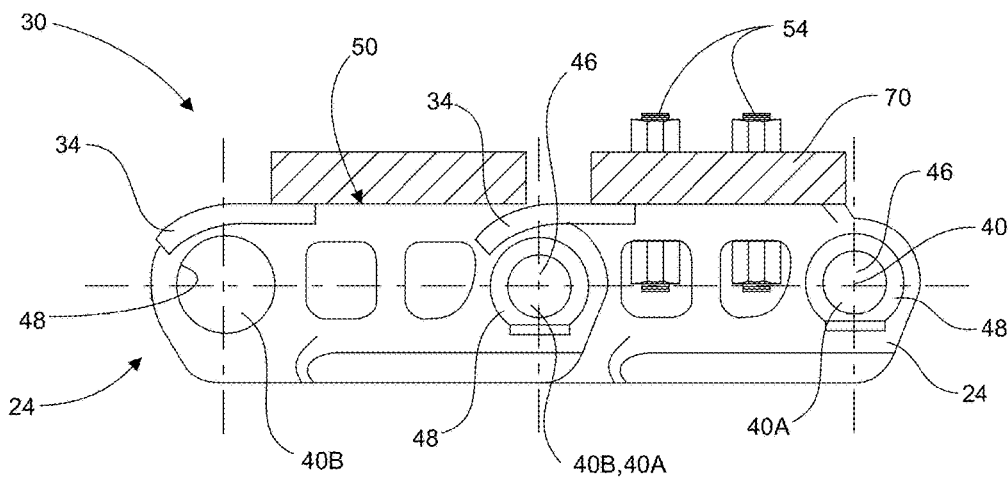
FIGS. 11A and 11B are side and plan views of two chain link sets sold by CATERPILLAR™, both of which are fit with pans, one of which is secured with bolts to its corresponding link set.
Figure 11B:
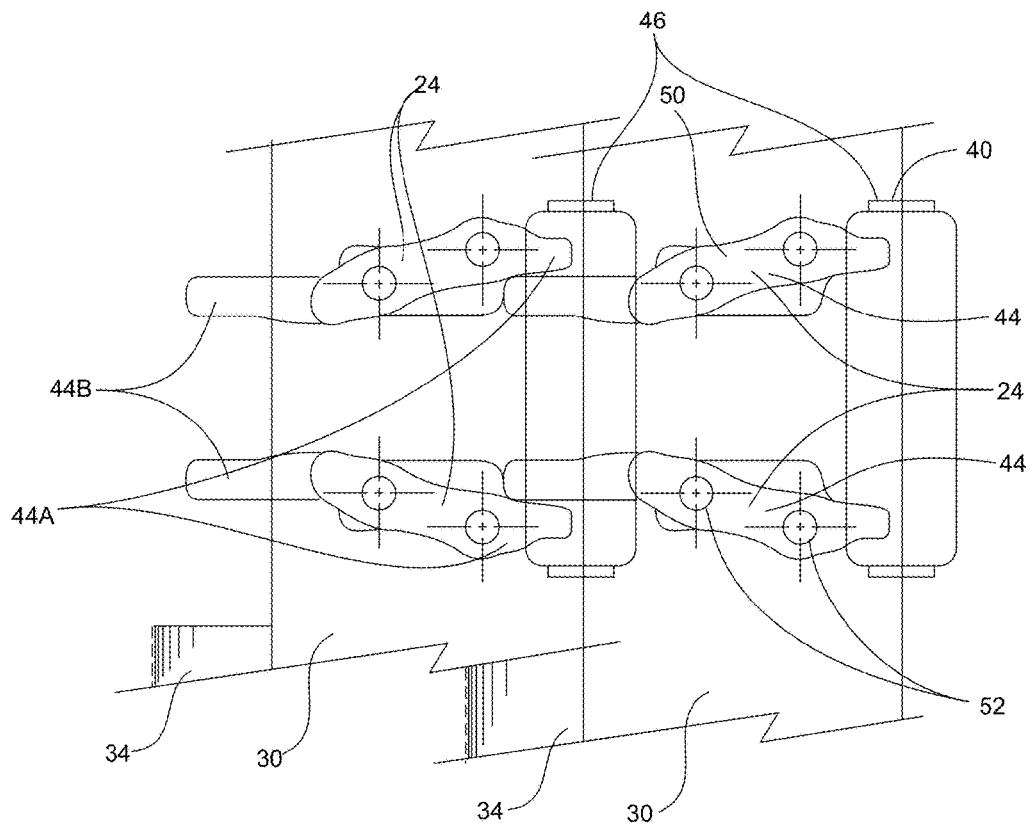

With reference to FIG. 4A and FIGS. 11A to 11D, each conveyor chain 22L,22R is constructed from a plurality of chain links 24,24 . . . which are articulately coupled in a transverse relation along a longitudinal centerline of the chain by hinge joints 40. As shown in FIG. 11B, each link 24 has a leading and trailing joint 40A,40B, the leading joint 40A of one link 24 joined to the trailing joint 40B of the preceding link 24. Conventionally, as shown in FIG. 2A,2B, the links 24 of parallel chains 22L,22R are driven and synchronized by spaced sprockets of a drive shaft. Each pan 30 is bolted to opposing, synchronized chain links 24,24. In the industry, the chain and link designs are typically generic, supplied for example by CATERPILLAR™ or KOMATSU™. Each link 24 is typically formed of a pair of laterally spaced and mirror-shaped inboard and outboard link members 44,44 coupled together to form a link set. Each link member 44 has one end laterally shifted from the other end, the mirrored, shifted ends, when coupled at their respective joints 40 form a narrow profile sandwiched between the other end's wider profile, enabling a repeating and endless chain 22L,22R having a chain width of the wider profile. The coupling is achieved at each joint 40 using a pin 46 engaging inboard and outboard pin bosses 48 of the respective link members 44. In other words, the shifted end is laterally offset inwardly toward the centerline of the chain 22, while the other wider end laterally offset outwardly, therefrom.

Each link set 24 forms a longitudinally disposed, mounting surface and having two or more bolt receiving bores 52 formed therethrough, conventionally for attachment of tracks in tracked vehicle applications, and for attaching pans in the apron feeder applications. As each link member 44,44 has an offset between the leading and trailing ends, two bolt-receiving bores 52,52 on each link member 44 are typically also offset and, for a chain link set, resulting in four bolt bores 52,52,52,52 arranged in an isosceles trapezoid pattern transverse across the link members 44,44.

With reference to FIGS. 12A through 12E, the wings 8 are formed from a flat wing plate 8P using right-angle forming process, resulting in an L-shape having a base 8B for mechanical fastening to the pan and the upstanding wing itself 8U. The base 8B and pan 8U can have corresponding bolt bores 52W for mechanical fastening together using fasteners 54. To minimize the number of bolt holes or bores 52, the wing base 8B can utilize bolt holes 52W that correspond to two of more of the pan-to-chain link set connection as shown in FIG. 12E.

Each wing 8 is laterally splayed for overlapping configuration with adjacent wings. Accordingly, as shown in FIGS. 12B and 12C, two wing styles are manufactured, being mirror images of each other, one for a left end wing 8L, and one for a right end wing 8R. The wings are flat plates that are bent into angle brackets having left and right opposite hand splayed arrangement for overlapping arrangement on opposing ends of the each pan 30.

Through mechanical connection of the wing 8 and pan 30, stress risers associated with welding are eliminated. Further, should a wing failure occur, replacement is a simple process that can be scheduled during the next turnaround. Idlers are also mechanically fastened to the outboard ends of specified pans, simplifying assembly, maintenance and minimal weld-impact to the pan.

Returning FIGS. 4B, 4C, and 5 through 8, in embodiments, embodiment of the standard pans 30 comprise a hollow, box structural steel girder or beam extending transversely across the apron feeder and at least under the live load. Herein, the pan 30 itself includes a new beam structure to aid in deflection and stress management. The beam is an elongate beam structure extending transversely across the conveyor and having a beam axis A, the beam structure comprising an upper plate 70 with overhanging portions, extending outward at opposing left and right distal ends 32L,32R. Each distal end is adapted for bolted wings 8L,8R and for connection to its respective chain link set 24,24.

In embodiments each left and right distal end 22L,22R has left and a right outboard chain connection interface for mechanical securement to corresponding left and right chain link sets 24,24.

As shown in FIG. 5, each wing 8 is secured adjacent each distal end 32L,32R comprises an L-shaped wing 8 having the base portion 8B mechanical connected to the pan's upper plate 70. The base 8P, when fastened to the pan 30, locates and orients the upstanding portion to be located outward of its respective hopper wall and generally parallel thereto for restraining material from escaping the material bed within the hopper walls.

Periodically, a pan of the plurality of pans also fit with an idler bracket and idler wheel, the brackets affixed to each of the left and right distal ends. The idlers support the chain conveyor and pans, including on the return path from the head to the tail end of the conveyor. Carry rollers or idlers on the pans support the chains on the top material bed side on travelling rails. On the return underside, pans are supported on the idlers attached to the grouser pans travelling on return rails. Opposing tracks are provided under the conveyor to engage the idler wheels.

Figure 11C:
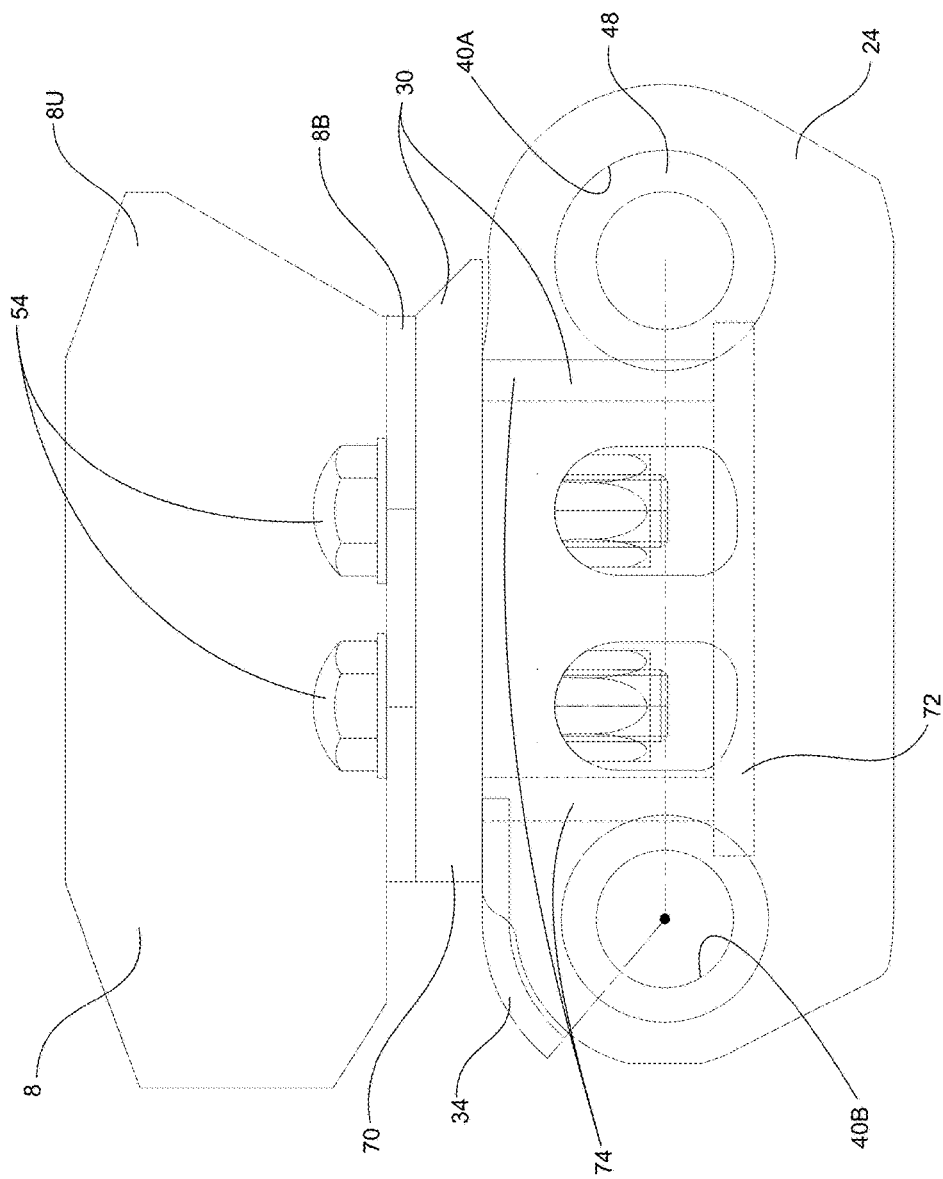
FIG. 11C illustrates and end view of one claim link set fit with an embodiment of the bolted pan with only the bolts shown securing the wing base through the upper pan to the chain link set.
Figure 13A:
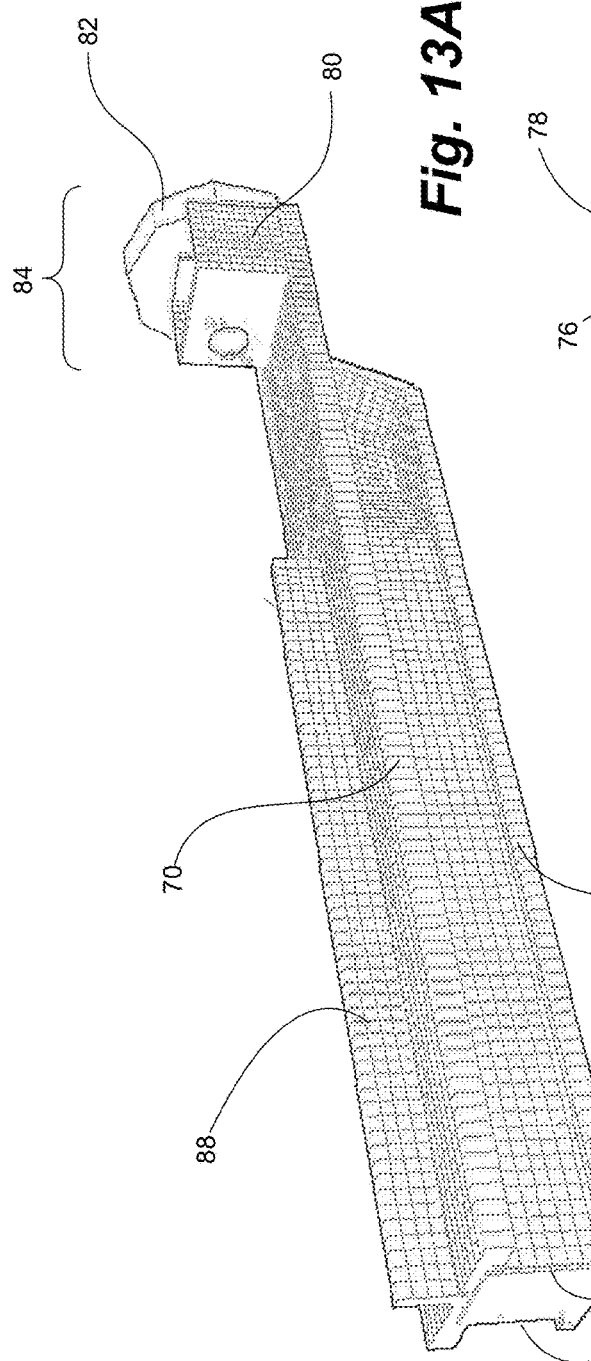
FIG. 13A is a perspective FEA 3D model of one end of a grouser pan.
Figure 13B:
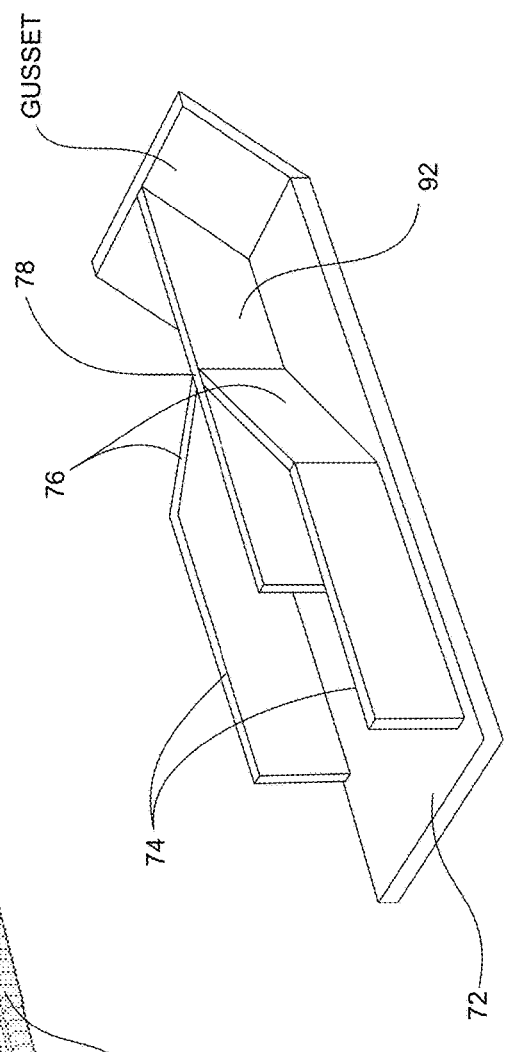
FIG. 13B is an enlarged perspective view of the beam structure with the upper plates removed to view the webs, converging portion and stiffener rib.

With reference to FIGS. 11C and 12E, each wing is mechanically fastened to its respective left and right distal end 22L,22R by bolting to the upper plate 70 of the pan 30. While the wing 8 can be bolted to the upper surface 70 by dedicated and corresponding bolt holes 52w through the base and upper plate, one can also use one or more of the fastener bores 52 of the chain connection. As shown in FIG. 12E, two bolt holes of the wing base 8B are arranged to correspond to two of the offset bores 52 of the chain link set 24 and pan's distal end 32L or 32R. While the two bolt holes 52 can be active clamping fastener connections, the wing could also be connected through one fastener 54 and one pinned connection for resisting azimuthal rotation. As shown, both fasteners 54 are active in that they both secure the wing's base 8B to the pan 30 and act to resist rotation in the plane of the surface of the pan's upper plate 70.

As shown in FIG. 11C, the fasteners 54, shown here as bolts, can be selected from those normally provided by the supplier of the chain link set 24. Depending on the bolt length, and the thickness of the wing base 8B, one might utilize longer bolts for the two bolts at for wing 8, pan 30 and chain link 24 connection, and two original length bolts for the pan 30 to chain link 24 connection.

EXAMPLE

With reference to FIGS. 6A through 6D and FIG. 13A, the pan for an apron feeder is a beam. Generally the live loads are perpendicular to the axis A of the beam, a vertical load along the Y-axis supporting the downward weight of the material load and a horizontal force in the X-axis, being a reactive rearward load due to the forward drive or travel direction T of the material bed.

The pans 30 are supported at the distal beam ends 32L,32R. The beam ends are not simply supported but are fixed or cantilevered to a certain extent by the resistance of the conveyor chain 14 to overturning under vertical loads and resistance of a chain link 24 to twisting out of alignment from the chain 14. Accordingly one expects both bending and shear stresses at the connecting interface between the middle of the beam 30M and the point of connection of the left and right ends 32L,32R to the left and right chain link sets 24,24 respectively.

As shown in the deflection model of FIG. 14, being a one-half beam 3D model, the middle section 30M deflects downward in response to the supported material weight, and the maximum deflection at the middle or center of the pan. Also, the pan's middle section 30M deflects rearward (not shown), in response to the material drag along the material bed, again the maximum rearward deflection at the center of the pan.

The pan's distal ends 32L,32R, having a fixed aspect at the chain link connection interface, resist beam rotation imparted by the bi-axial loading and, as a result, stresses arise at the interface of the distal end and the middle portion of the pan. Herein, compressive loading is deemed negative (−ve) and tensile loading as positive (+ve).

For the prior art form of pan, having welded wings at each pan end's connecting interface, the resulting stresses are significant and both require significantly more particular welding protocol to minimize stress risers, and yet also result in limitation to fatigue life. The term detail category is used to describe the severity of the stress concentrations ranging from severe for structures with many discontinuities and welding heat affected zones, and the least with rolled shapes. Generally, seven basic fatigue categories have been established: A, B, B', C, D, E and E'. Each is based on actual test-to-failure of specific joint types and geometries. These range from plain as-rolled material away from any welds (Category A) to abrupt geometric and metallurgical gradients that create severe stress concentrations (Category E'). Herein a finite element stress analysis is illustrated using a like-beam construction for both a prior welded wing and implementing an embodiment a mechanically fastened wing. The resulting stresses are compared.

In both cases, the analyses presented here are based on the input data of Table 1. The pan dimensions are described further below.

TABLE 1

| | |
|---|---|
| Maximum and nominal chain tensions respectively | 1500 and 980 kN |
| Height and width of grouser plate =, respectively | 75 and 2400 mm |
| Pitch between chain links or successive pans | 317.5 mm |
| Maximum and nominal speed of A/F | 0.50 and 0.35 m/sec |
| Density of oilsand material above pans | 18.5 kN/m3 |

The entire chains' tension is attributed to resistance through material pressure in front of grousers 88 and shearing stress on the top surface of the carrier upper plates 70 of the pans 30; the ratio of the two mechanisms being 1:4.

Finite Element Analyses (FEA), performed using a structural analysis and design program such as STAAD PRO™ provided by Bentley Systems, Inc., California USA, were performed for both welded wings and bolted wings. A ½ pan having a grouser was modelled. The grouser pan is subjected to higher forces due to the material pressure ahead of the moving pan and in practice has been noted to fail before a standard pan. Accordingly, the modelled stresses are expected to be higher in the upper carrier plates of the grouser pans than in those of standard pans. Design based on grouser pans will be conservative designs.

As shown in Table 2, four service load cases (LC) were considered included the deadload (DL) of the pan conveyor, the vertical load of the material in the hopper, and the nominal and maximum chain tensions to pull the material forward.

TABLE 2

| Load case | Description | Applied loads | Load resultant on ½ pan |
|---|---|---|---|
| 1 | Dead load, DL | | $\Sigma Fy$ = 4.3 kN |
| 2 | Vertical material | $p_v$ = 115 kPa | $\Sigma Fy$ = 50.5 kN |
| 3 | Nominal chain tension | $p_{x\text{-}grouser}$ = 145 kPa; $p_{x\text{-}carrier\ PL}$ = 24 kPa | $\Sigma Fx$ = 23.4 kN |
| 4 | Maximum chain tension | $p_{x\text{-}grouser}$ = 222 kPa; $p_{x\text{-}carrier\ PL}$ = 36 kPa | $\Sigma Fx$ = 35.8 kN |

The pan 30 is built-up with steel plates of Grade 350WT, Category 4-complying with CSA G40.20/G40.21-98. The pan beam structure forms a box section along most of the 3500 mm span between the chain conveyors 22L,22R. The box structure, with spaced webs, provides stiffness in both the vertical and lateral directions. The upper plate 70 or carrier plate thickness was set at 1.5" to compensate for wear at both sides of the pan 30, particularly adjacent to the hopper walls 26,26.

In more detail, the modeled pans 30 comprised an upper plate 70 being 38 mm (thick)×300 mm (wide)×3890 mm (long). The lower plate 72 is 25 mm×245 mm×2980 mm, about 76% of the plan length, leaving about 420 mm overhang. The spaced webs 74 each are 20 mm×125 mm (high) by 2360 (long), extending about 60% of the length of the pan 30, the ends of which terminate short of the length of the lower plate 72. At each end, the web further comprises two converging plates 76,76 are 20 mm×125 mm and 175 long, each arranged at the end of its respective web 72 and converging to an apex 78 at a stiffener rib 92 centered along upper and lower plates. The stiffener rib is 20 mm×125 mm (high) by 396 mm (long), the end of which terminates at about the end of the lower plate 72.

Design of the upgraded pan 30 having a bolted wing 8 is based on minimizing the mid-span and lateral/transverse deformations, in one aspect, to eliminate the need for slide rails and to retain an elastic behavior of the pan throughout its lifespan. The upper carrier plate 70 was noted to exhibit the highest stresses of the pan model at about the connection interface. For each of the load cases LC or load combinations thereof (Table 2), normal stresses have been designed to be below threshold limits at critical zones in the carrier plate.

Practically, stresses were designed to be below threshold limits under a combination of LC #2 (vertical live load) and #3 (design or nominal chain tension) and under a combination of #2 (vertical live load) and #4 (maximum chain tension). The acceptable threshold limits are those dictated as specified in CAN/CSA S16-09. The maximum Von Mises stresses due to factored load combinations are limited to ($\phi$ $F_y$); where $\phi$=0.9 which is a resistance reduction factor and $F_y$=350 MPa, being the specified yield strength of the selected steel.

Turning to Table 3, maximum service displacements due to the combination of DL and maximum operational loads are set forth for the combination of the load cases LC #1, #2 and including the maximum chain tension case #4. With reference as well to FIG. 14, the deformed shape of the pan 30 under the combined service load is illustrated in Y-direction of the 3D-model.

TABLE 3

| Load case | Dx (mm) - | Dy (mm) | Dz (mm) |
|---|---|---|---|
| DL (LC #1) | 0.003 | 0.088 | −0.005 |
| Maximum | 0.670 | 1.988 | 0.884 |
| Σ | 0.673 | 2.076 | 0.879 |

Figure 15A:
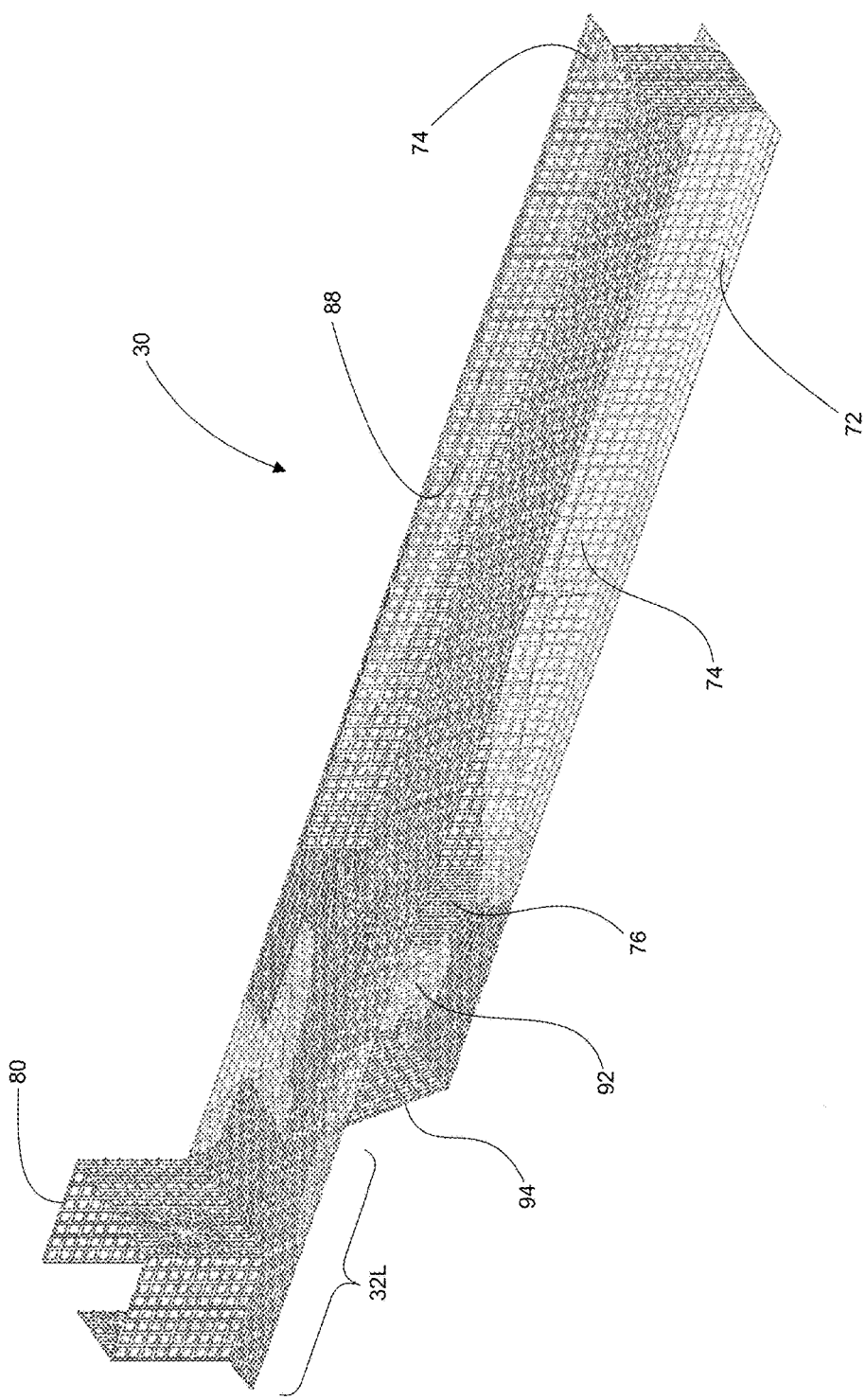
FIGS. 15A and 15B are black and white and a color FEA von mises stress analysis respectively of the 3D model of FIG. 13A under maximum operational loads.
Figure 15B:
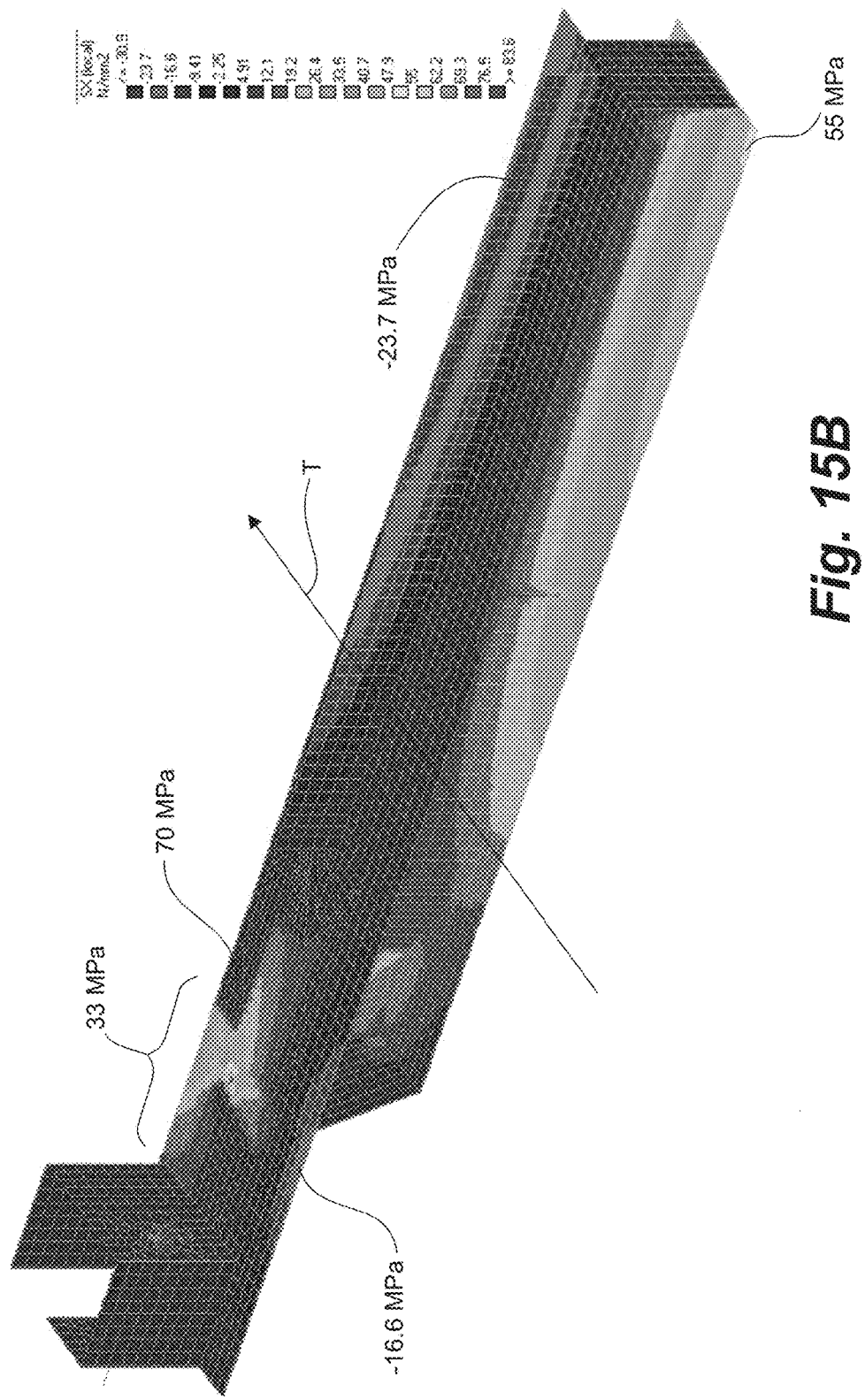

With reference to FIGS. 15A and 15B, for the current mechanically fastened wing embodiment, and as shown in Table 4, the relevant tensile stresses were determined to be 33 MPa due to nominal operational loads; and 42 MPa under to maximum operational loads. The stresses were located in the vicinity of the connection interface coincident to the wing plate's location, and parallel to the leading edge of the carrier plate.

These values represent the stress ranges, $f_{sr}$, to be induced in the upper carrier plate's base metal of the pan. According to Clause 26.3 of CAN/CSA S16-14, the detail category of the carrier plate in this area is "C1" with an allowable threshold stress range, $F_{srt}$=83 MPa. Since the $f_{sr}$ values are less than $F_{srt}$, any potential cracks in the manufactured pan do not propagate through the design life of the pan. In other words, the fatigue life of the detail area of the investigation is infinite. In practice, the life of a pan is expected to be in the order of 50,000 lifetime hours, well above a design operational life of around 30,000 hours.

Note that the Von Mises stress plot of FIG. 15B indicates an anomaly with a higher than expected high stress. The anomaly is close to the axis of the upper plate and at the end of the stiffening rib. Typically, at this area stresses, due to lateral material driving forces, are expected to be minimal close to the neutral axis of the carrier plate's rectangular section. However, the indicated high stress is attributed to a 3D modelling meshing irregularity and the roughly 70 MPa is not deemed to be governing stress value in Table 4.

For comparative purposes, a welded wing 8 was modelled on the same box beam structure as the current embodiment, thereby identifying the effect of a welded connection of the wings. As shown in Table 4, the resulting stress analysis illustrated the marked improvement of the current bolted wing embodiments over the prior welded wing approach.

The comparative model for the welded wing incorporated 8 mm fillet welds perpendicular to the tensile stress direction in the carrier plate. The inherently compromised welded arrangement results in a detail category "E" with an allowable threshold shear stress range in the fillet weld's throat, $F_{srt}$=31 MPa.

The determined shear stress ranges, $f_{sr}$, in the fillet weld's throat turned out to be 157 and 200 MPa for the nominal and maximum operational loads, respectively. The $f_{sr}$ values are inversely proportional to the size of the fillet weld. Since $f_{sr}$ exceeds $F_{srt}$, potential micro-cracks will grow due to the stress riser detail and fatigue life will be shortened. In operation, cracking of the pan at the wing welds was indeed noted and an operational life of a welded-wing pan of well under a nominal design of 28,000 hours.

From the above conditions, Table 4 sets forth the normal stress change due to both the nominal and maximum operational cases at two critical locations, comparing the current bolted wing and with a prior art configuration of the fillet-welded wing to the carrier plate.

TABLE 4

| Location | Carrier plate in vicinity of chain link (MPa) | Bottom flange at mid-span (MPa) |
|---|---|---|
| Pan with bolted wing plate (FIG. 7, 15B) | | |
| fsr (MPa) due to nominal operational loads | 33 | 47 |
| fsr (MPa) due to maximum operational loads | 42 | 56 |
| Detail Category/$F_{srt}$ (MPA) | C1/83 | C1/83 |
| Pan with fillet-welded wing plate to carrier plate (FIG. 16) | | |
| fsr (MPa) due to nominal operational loads | Shear stress in fillet weld's throat = 157 | 47 |
| fsr (MPa) due to maximum operational loads | Shear stress in fillet weld's throat = 200 | 56 |
| Detail Category/$F_{srt}$ (MPA) | E/31 | C1/83 |

Returning to the current embodiment for a bolted wing, Table 5 lists the factored load combinations and the maximum factored Von Mises stress in the pans' plates. The factored Von Mises stresses are less than the limiting stress value, $\phi$ $F_y$=315 MPa.

TABLE 5

| Factored load combination | Load factors assigned to service loads (see Table 2): | | | | Maximum Von Mises (MPa) |
|---|---|---|---|---|---|
| | 1 | 2 | 3 | 4 | |
| 300 | 1.25 | 1.50 | 1.50 | | 193 |
| 301 | 1.25 | 1.50 | | 1.10 | 200 |

The embodiments of the invention for which an exclusive property or privilege is claimed is defined as follows:

1. A pan having spaced wings for an apron feeder having a material hopper and outboard chain conveyors, the chain conveyors having a plurality of said pans and wings, each pan comprising:
   an elongate beam structure extending transversely across the chain conveyors having an upper plate with overhanging portions at opposing left and right distal ends, each left and right distal end of the upper plate having a left and a right outboard chain connection interface for connection to the outboard chain conveyors;
   each left and right distal end having an L-shaped wing having a base portion for parallel and mechanical connection to the upper plate, and an upstanding portion located inward of the left or right outboard chain connection interface, respectively;

wherein the outboard chain conveyors comprise left and right opposing chain links sets of axially extending, parallel and spaced endless conveyors, and each pan is connected at corresponding left and right opposing chain links sets, the plurality of adjacent pans forming a material bed between opposing hopper walls, the material bed having a bed width supporting and transporting a live load of material axially along the feeder;

each left and a right outboard chain connection interface is adapted for mechanical securement to the corresponding left and right chain link sets; and wherein each of the left and right distal ends has four or more bolt holes corresponding to four or more receiving holes in the corresponding chain link set, two inward and two outward bolt holes.

2. The pan of claim 1 wherein the base of each L-shaped wing is mechanically fastened to the upper plate with the mechanical fastening of the chain connection interface to the chain link set.

3. The pan of claim 1 wherein the base portion of each L-shaped wing is mechanically fastened to the upper plate separate from the mechanical fastening of each chain connection interface to each respective chain link set.

4. The pan of claim 1, wherein each L-shaped wing is formed of a single plate bent into the L-shape.

5. The pan of claim 1, wherein the pan's upper plate comprises a unitary member having an upper surface for receiving and conveying material thereon, and a lower surface, the lower surface at the left and right distal ends adapted for connection to its respective left and right chain link set.

6. The pan of claim 1, wherein the elongate beam structure further comprises the pan's upper plate, a lower plate, and a pair of parallel and upstanding webs extending along the beam axis and spaced apart by a web spacing less than about a plate width, each left and right end of the lower plate and webs terminating short of the chain conveyors for forming the overhanging portions at the left and right distal ends.

7. The pan of claim 6, wherein left and right ends of the pair of upstanding webs further comprise converging web portions, the web portions converging from the parallel web spacing to an apex at about a centerline of the upper and lower plates, the converging web portions terminating short of the left and right chain link set.

8. The pan of claim 7, wherein the elongate beam structure further comprises upstanding stiffener ribs adjacent each of the left and right distal end, each stiffener rib secured along the centerline of the upper and lower plates, and extending between the pair of converging web portions, each rib terminating short of the left and right chain link set respectively.

9. The pan of claim 6, wherein the elongate beam structure further comprises upstanding stiffener ribs adjacent each of the left and right distal end, each stiffener rib secured along the centerline of the upper and lower plates, and extending between the pair of upstanding webs, each rib terminating short of the left and right chain link set respectively.

10. The pan of claim 1, wherein each wing plate base portion has two or more bolt holes formed therein and corresponding to the two inward bolt holes.

11. An apron feeder assembly comprising:

a hopper having at least opposing left and right hopper walls, a pair of spaced endless conveyors of chain link sets; and a plurality of pans; each pan connected to corresponding left and right opposing chain links sets for forming a material bed between the opposing left and right hopper walls for transporting a live load of the material axially along the feeder, each pan comprising an elongate beam structure extending transversely across the material bed and having an upper plate, the upper plate overhanging the beam structure at opposing left and tight distal ends, each left and right distal end having, respectively, a left or a right outboard chain connection interface for mechanical securement to corresponding left and right chain link sets;

each left and right distal end having, respectively, four or more bolt holes corresponding to four or more receiving holes in the corresponding chain link set, two inward and two outward bolt holes; and inward of each left and right connection interface, a wing arranged adjacent outward of its respective hopper wall, each wing comprising a formed L-shaped wing plate having a base portion for mechanical connection to the upper plate and an upstanding portion for restraining material bed within the hopper wall.

12. The apron feeder of claim 11, wherein the plurality of pans comprises a mixture of featureless standard pans and grouser pans.

13. The apron feeder of claim 11, wherein at least some of the pans of the plurality of pans comprise idler pans, each idler pan supporting an idler at the left and right distal ends, the idlers further comprising an idler support box secured to each of the left and right distal ends and having an idler wheel extending laterally from the support box for engaging an idler track outward of the pans.

14. The apron feeder of claim 11 wherein the base of each L-shaped wing is adapted for mechanical fastening to the upper plate with the mechanical fastening of the chain connection interface to the chain link set.

15. The apron feeder of claim 11, wherein each L-shaped wing is formed of a single plate bent into the L-shape.

16. The apron feeder of claim 11, wherein the elongate beam structure further comprises the pan's upper plate, a lower plate, and a pair of parallel and upstanding webs extending along the beam axis and spaced apart by a web spacing less than about a plate width, each left and right end of the lower plate and webs terminating short of the chain conveyors for forming the overhanging portions at the left and right distal ends.

17. The apron feeder of claim 16, wherein the elongate beam structure further comprises upstanding stiffener ribs adjacent each of the left and right distal end, each stiffener rib secured along the centerline of the upper and lower plates, and extending between the pair of converging web portions, each rib terminating short of the left and right chain link set respectively.

18. The apron feeder of claim 11, each wing plate base portion has two or more bolt holes formed therein corresponding to two or more receiving holes in the corresponding chain link set.

19. The apron feeder of claim 11 wherein each wing base portion has two or more bolt holes formed therein and corresponding to the two inward bolt holes.

20. The apron feeder of claim 11 wherein the base of each L-shaped wing is adapted for mechanical fastening to the upper plate separate from the mechanical fastening of the chain connection interface to the chain link set.

\* \* \* \* \*